(12) United States Patent
Chatzidrosos et al.

(10) Patent No.: US 12,555,018 B2
(45) Date of Patent: *Feb. 17, 2026

(54) PHYSICAL MEDIA INCORPORATING COLOUR CENTRES FOR USE IN QUANTUM SYSTEMS

(71) Applicant: Microsoft Technology Licensing, LLC, Redmond, WA (US)

(72) Inventors: Georgios Chatzidrosos, Cambridge (GB); Foteini Karinou, London (GB); Patrick Neil Anderson, Cambridge (GB); Hitesh Ballani, Cambridge (GB); Anna Mitenkova, London (GB); Antony Ian Taylor Rowstron, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 604 days.

This patent is subject to a terminal disclaimer.

(21) Appl. No.: 18/069,139

(22) Filed: Dec. 20, 2022

(65) Prior Publication Data
US 2024/0020567 A1    Jan. 18, 2024

(30) Foreign Application Priority Data
Jun. 17, 2022 (GB) ...................... 2208965

(51) Int. Cl.
*G06N 10/40* (2022.01)
(52) U.S. Cl.
CPC .................... *G06N 10/40* (2022.01)
(58) Field of Classification Search
CPC ..................................................... G06N 10/40
See application file for complete search history.

(56) References Cited

U.S. PATENT DOCUMENTS 11,361,240 B2   6/2022 Roberts et al.
2017/0221032 A1   8/2017 Mazed
(Continued)

FOREIGN PATENT DOCUMENTS

CN   114207631 A   3/2022
WO   2021013308 A1   1/2021
(Continued)

OTHER PUBLICATIONS

"Microwave Electric and Magnetic Field Measurement and Characterization", Retrieved From: https://cuos.engin.umich.edu/researchgroups/ultrafast-microwave-photonics/research/microwave-electric-and-magnetic-field-measurement-and-characterization/?msclkid=b7718697b3dc11ec9328cb3fbaebdfe5, Retrieved on: Jan. 6, 2023, 7 Pages.
(Continued)

*Primary Examiner* — Nghia M Doan
(74) *Attorney, Agent, or Firm* — Alleman Hall LLP

(57) ABSTRACT

An apparatus comprising: a crystal; a wire pair formed of a first wire connected so as to receive a first alternating current, and a second wire connected so as to receive a second alternating current substantially antiparallel to the first alternating current in the first wire, and located adjacent the first wire such that a localized electromagnetic filed is created in a region local to the wire pair via constructive electromagnetic interference between the first wire and the second wire in the region local to the wire pair and destructive electromagnetic field interference between the first wire and the second wire outside of the region local to the wire pair; and a colour centre located within the crystal in the region local to the wire pair.

14 Claims, 12 Drawing Sheets

(56) References Cited

U.S. PATENT DOCUMENTS

| | | | |
|---|---|---|---|
| 2019/0235031 A1* | 8/2019 | Ibrahim | G01R 33/24 |
| 2021/0263116 A1 | 8/2021 | Bar-Gil et al. | |
| 2022/0318661 A1 | 10/2022 | Meijer | |
| 2023/0409947 A1 | 12/2023 | Chatzidrosos | |
| 2023/0409948 A1* | 12/2023 | Chatzidrosos | G06N 10/40 |

FOREIGN PATENT DOCUMENTS

| | | |
|---|---|---|
| WO | 2021018654 A1 | 2/2021 |
| WO | 2021051163 A1 | 3/2021 |

OTHER PUBLICATIONS

Bradley, et al., "A Ten-Qubit Solid-State Spin Register with Quantum Memory up to One Minute", In Journal of Physical Review X, vol. 9, No. 3, Sep. 11, 2019, 13 Pages.

Dutt, et al., "Quantum Register Based on Individual Electronic and Nuclear Spin Qubits in Diamond", In Journal of Science, vol. 316, No. 5829, Jun. 1, 2007, pp. 1312-1316.

Meinel, et al., "Heterodyne Sensing of Microwaves with a Quantum Sensor", In Journal of Nature Communications, vol. 12, No. 1, May 12, 2021, 8 Pages.

Nagata, et al., "Universal Holonomic Quantum Gates Over Geometric Spin Qubits with Polarised Microwaves", In Journal of Nature Communications, vol. 9, No. 1, Aug. 13, 2018, 10 Pages.

Parra-Rodriguez, et al., "Digital-Analog Quantum Computation", In Journal of Physical Review A, vol. 101, No. 2, Feb. 6, 2020, 12 Pages.

Seck, et al., "Single-Ion Addressing Via Trap Potential Modulation in Global Optical Fields", In New Journal of Physics, vol. 22, No. 5, May 7, 2020, 12 Pages.

Shi, et al., "A Quantum-Based Microwave Magnetic Field Sensor", In Journal of Sensors, vol. 18, No. 10, Sep. 30, 2018, 14 Pages.

Srinivas, et al., "High-Fidelity Laser-Free Universal Control of Trapped Ion Qubits", In Journal of Nature, vol. 597, No. 7875, Sep. 9, 2021, pp. 209-213.

Wang, et al., "Individual Addressing of Ions Using Magnetic Field Gradients in a Surface-Electrode Ion Trap", In Journal of Applied Physics Letters, vol. 94, No. 9, Nov. 4, 2008, 3 Pages.

Zheng, et al., "Zero-Field Magnetometry Based on Nitrogen-Vacancy Ensembles in Diamond", In Journal of Physical Review Applied, vol. 11, No. 6, Jul. 5, 2019, 7 Pages.

International Search Report and Written Opinion received for PCT Application No. PCT/US2023/023312, mailed on Jan. 20, 2025, 14 pages.

Pezzagna, et al., "Quantum computer based on color centers in diamond", Applied Physics Reviews, vol. 8, Feb. 10, 2021, pp. 011308-1-011308-17.

Wolf, Michael S, "Coupling Nitrogen-vacancy Center Spins in Diamond to a Ferromagnetic Vortex", 2017, 159 pages.

Chatterjee, et al., "Semiconductor Qubits In Practice", In Repository of arXiv:2005.06564v1, May 13, 2020, pp. 1-27.

"International Search Report and Written Opinion Issued in PCT Application No. PCT/US2023/022586", Mailed Date: Aug. 14, 2023, 16 Pages.

Granata, et al., "Nano Superconducting Quantum Interference Device: A Powerful Tool for Nanoscale Investigations", In Journal of Physics Reports, vol. 614, Feb. 19, 2016, 1-69.

"International Search Report and Written Opinion issued in PCT Application No. PCT/US2023/022570", Mailed Date: Sep. 11, 2023, 15 Pages.

Non-Final Office Action mailed on Sep. 10, 2025, in U.S. Appl. No. 18/068,057, 11 Pages.

Non-Final Office Action mailed on Oct. 21, 2025, in U.S. Appl. No. 18/069,128, 12 pages.

\* cited by examiner

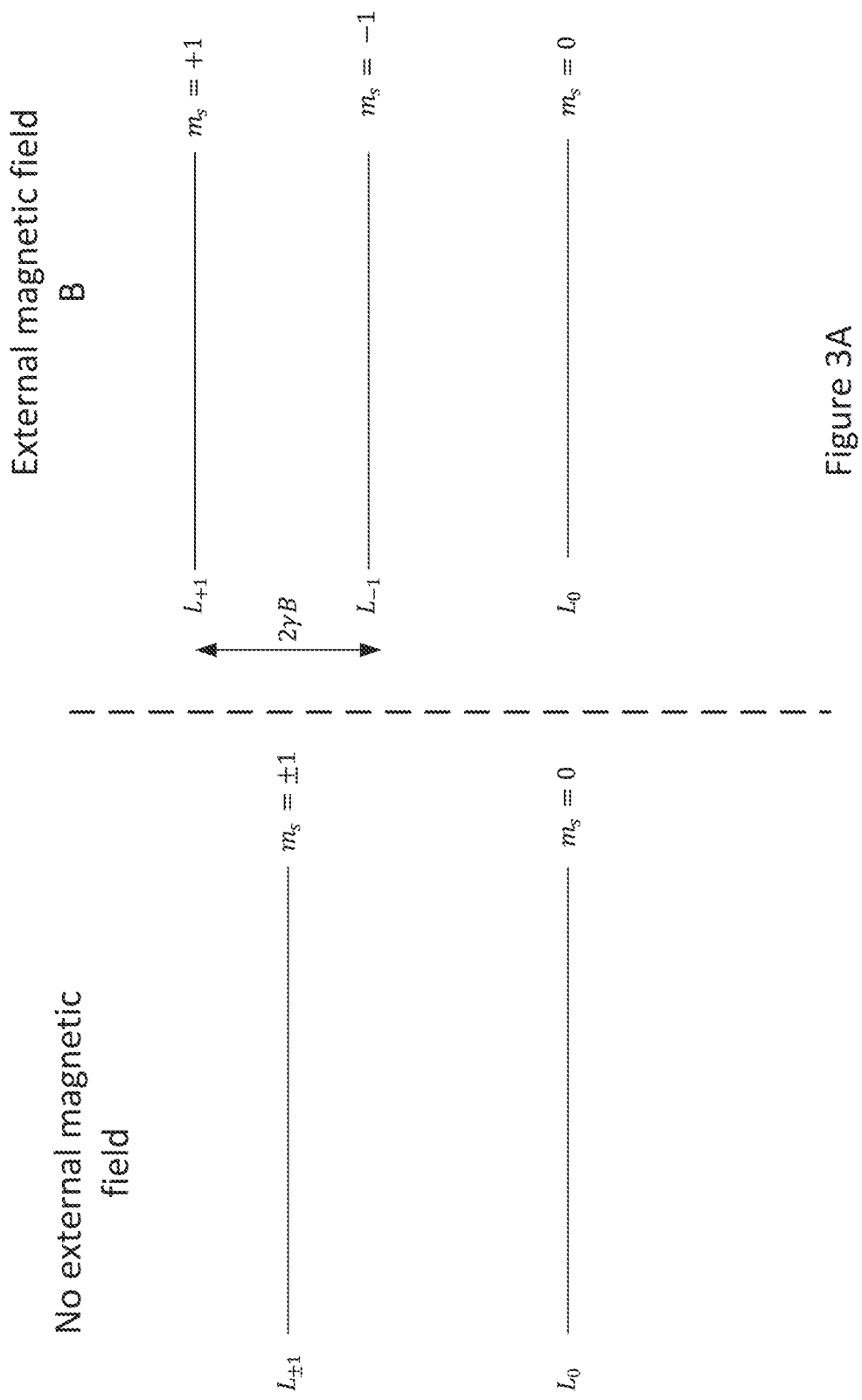

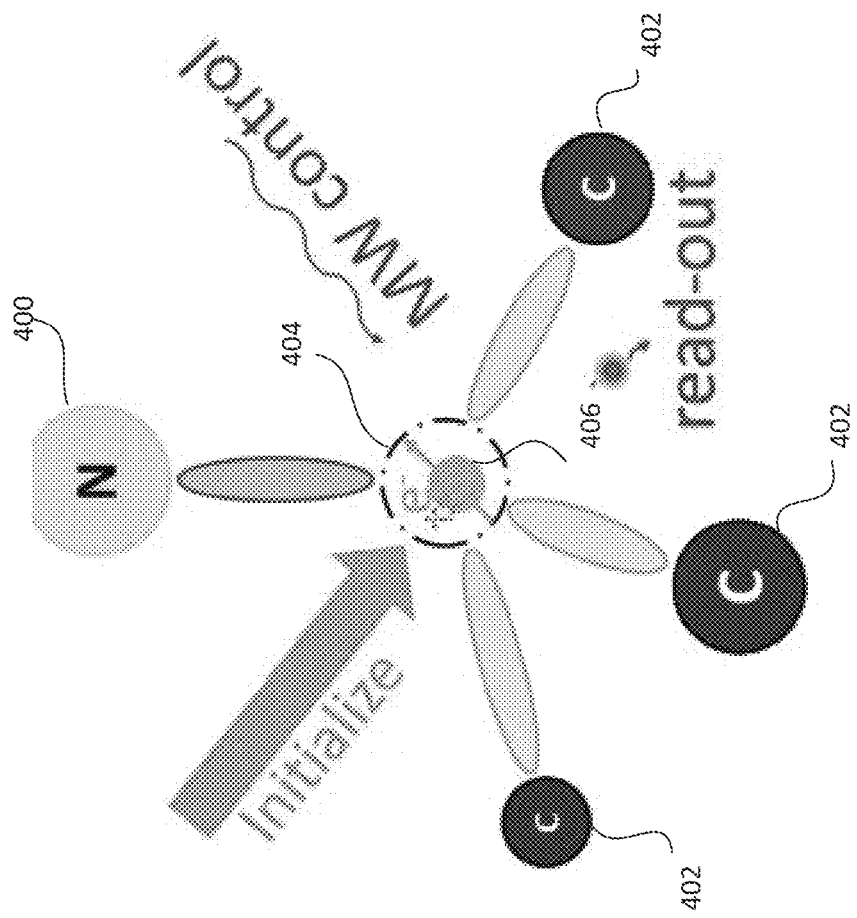

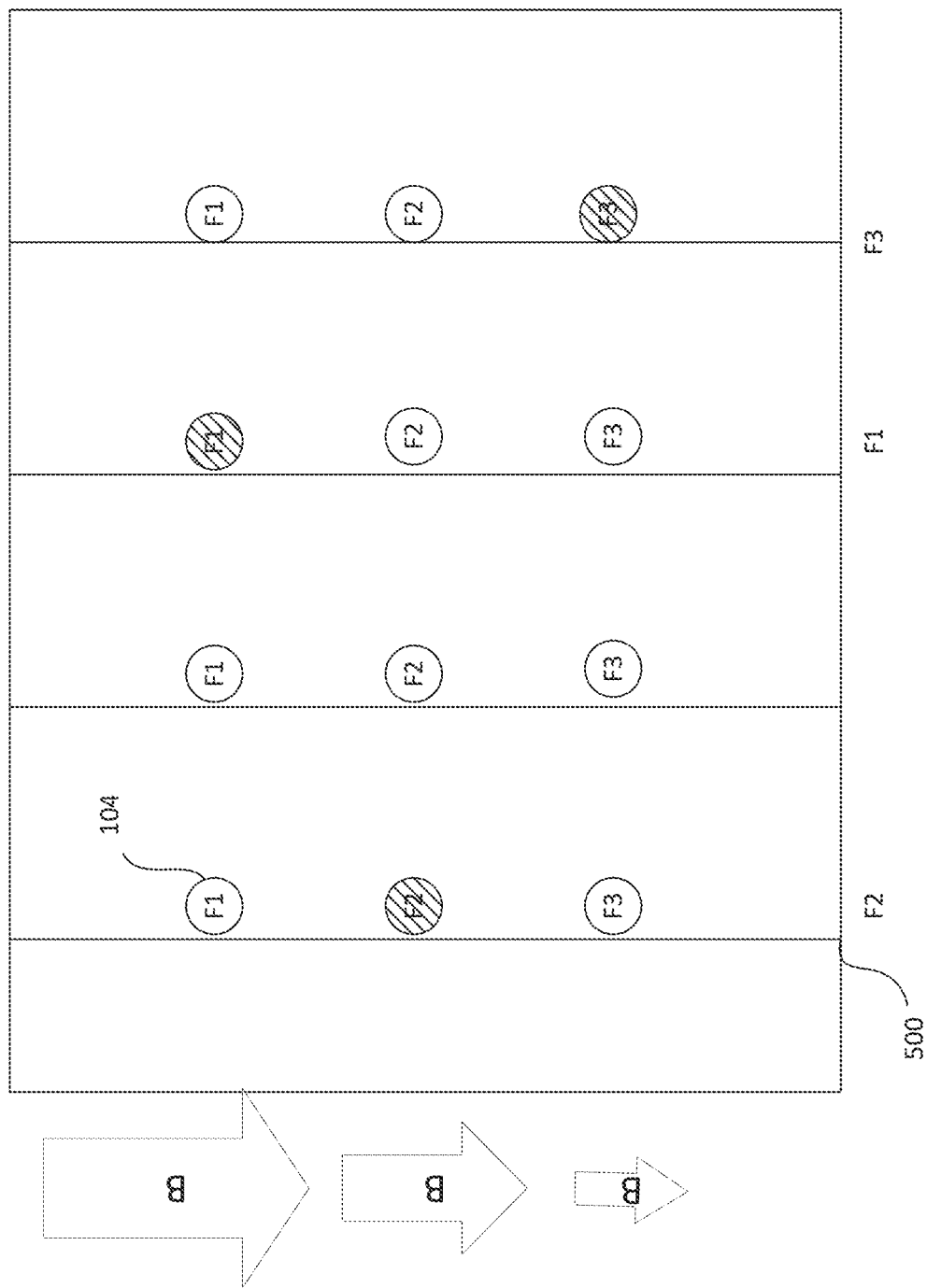

PHYSICAL MEDIA INCORPORATING COLOUR CENTRES FOR USE IN QUANTUM SYSTEMS

TECHNICAL FIELD

The present disclosure pertains generally to colour centres, and to devices, systems and other physical media incorporating the same, as well as practical applications thereof (e.g. in quantum computers, quantum sensors or other quantum devices or quantum systems).

BACKGROUND

Colour centres are defects in diamonds and other crystalline solids that have wide applications due to their physical properties, including quantum metrology and quantum computing. Such defects may be naturally-occurring or artificial.

A colour centre can be activated by applying an electromagnetic field in a particular orientation relative to the colour centre axis. The field can cause a change to the spin state of the colour centre. The electromagnetic field can be produced for example by running an alternating current along a wire, inducing an oscillating magnetic field around the wire.

Colour centres have proven to be important physical systems for various quantum technologies, including quantum metrology (e.g., magnetometry, thermometry, strain sensing), information processing and communications. One of their most promising applications is quantum computing, where colour centres have demonstrated, multi-qubit gates, quantum entanglement, quantum key distribution, etc.

For example, in a quantum computing application, a colour centre (or group of colour centres) operating as a qubit(s) may be activated in order to apply a particular quantum computing operation (such as a quantum state transformation or quantum state measurement). In a quantum metrology application, a colour centre (or group of colour centres) operating as a sensor(s) may be activated to capture a sensor measurement at a particular moment in time. In quantum metrology applications, different groups of colour centres operating as sensors can be selected to construct a 2D/3D image of a field or gradient. If instead of selected groups all the colour centres/sensors are activated at the same time only an average value of the measured quantity can be acquired.

SUMMARY

One technical challenge addressed herein is scalability of devices incorporating colour centres, such as quantum imaging arrays (e.g. with colour centres operating as sensors) or quantum computer chips (e.g. with colour centres operating as qubits). For example, one challenge in scaling up quantum systems based on colour centres is maintaining a capability for individual addressing of colour centres. For example, in quantum metrology and quantum computing applications, it is useful to be able to control each sensor or qubit independently. In an array of multiple colour centres, difficulties can arise in addressing individual colour centres. For example, when colour centres are activated via currents in a wire network, crosstalk/decoherence effects between nearby colour centres can limit individual addressability. Individual addressability of colour centres can be achieved in various ways, but not all of these are sufficiently scalable for practical deployment. For example, one possibility is to increase the physical spacing between colour centres to prevent crosstalk and/or decoherence effects between colour centres, which might otherwise occur when a signal intended to activate one colour centre inadvertently activates another nearby colour centre (which in turn could result, e.g., in a computational or sensing error). In one or more examples herein, a wire pair geometry is disclosed, in which a colour centre coupled to a wire pair may be activated via antiparallel currents through the wire pair. The wire pair geometry acts to reduce crosstalk/decoherence effects even at relatively short distances, allowing reduced physical spacing between colour centres, and thus improved scalability.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which:

FIG. 3a shows the splitting of energy states of a colour centre by an external magnetic field;

FIG. 4 shows a schematic diagram of a nitrogen vacancy centre in diamond;

FIG. 5 shows a schematic diagram of an example 2D configuration of colour centres in a crystal material;

DETAILED DESCRIPTION OF EMBODIMENTS

Figure 1:
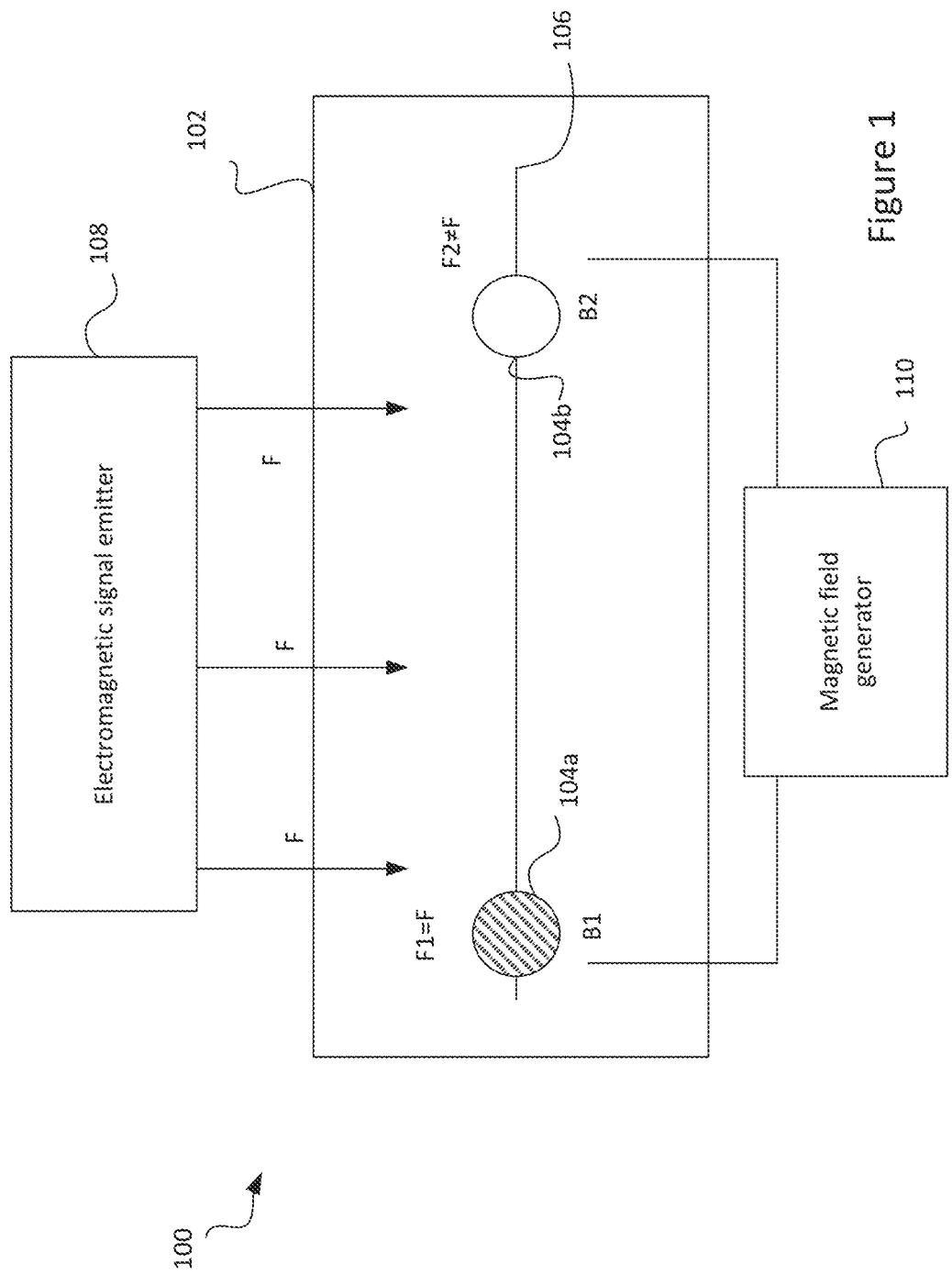
FIG. 1 is a schematic block diagram of a quantum system comprising two colour centres.

Example embodiments are described below. First, some relevant context to the described embodiments is provided.

A colour centre may be said to be coupled to a wire (or to a cross point between two crossing wires), and that terminology includes the case of a colour centre located sufficiently close to the wire that the colour centre may be activated by activating the wire (causing the wire to emit an electromagnetic signal e.g. by generating a current in the wire). For the avoidance of any doubt, this includes the case of a colour centre separated from a wire by a sufficiently small vacuum or air gap. A colour centre may be 'addressable' in that the colour centre can be activated by activating a wire to which it is coupled. An apparatus may refer to a crystal per se, or a crystal in combination with one or more other elements (such as a wire). An apparatus may be a complete device or other system, or only a component (or set of components) for use in such a system/device. A wire refers to any structure capable of carrying an electrical signal that results in the emission of an electromagnetic signal, and includes external or internal wires, wires printed on or otherwise attached to the crystal, integral wires (e.g. graphene channels formed in the crystal) etc.

Colour centres are said to be 'individually addressable' when they can be controlled with some degree of independence. This includes a situation in which any given colour centre can be activated without any effect on the other colour centre(s) (total independence), but the terminology is not limited in this respect. For example, it might be possible to generate an electromagnetic field that causes a desired operation to be applied to any given colour centre, and which also has some different, secondary effect on one or more other colour centre(s); such an arrangement can still provide individual addressability (albeit not total independence), in that the desired operation can be individually applied to any desired colour centre in a controllable way (in contrast to a situation where it is only possible to, say, apply the desired operation to all colour centres or a fixed subset of colour centres within a physical medium).

For some colour centres, such as nitrogen-vacancy colour centres, an external magnetic field is used to lift the degeneracy between its energy levels and thus allow an electromagnetic field of a given frequency to address the colour centre by changing its spin state, but other types of colour centres may be addressable in the absence of any external magnetic field. An example of this is the nitrogen-vacancy centre where the $m_s=\pm 1$ spin projection states of the $^3A_2$ ground state are degenerate at external magnetic field.

In a system with multiple colour centres, in order to address one colour centre only at a given time, each centre would be positioned proximate to a different respective electromagnetic field emitter (such as a current-carrying wire).

In principle, any given colour centre could be individually addressed by activating its associated emitter. However, this requires a separate and individually controllable emitter (e.g. wire) per colour centre. This limitation causes a challenge for scaling to larger numbers of colour centres, as a large number of individual wires need to be created for generating the fields for each centre.

Moreover, since electromagnetic fields radiate outwards from the wire at which they are generated, there is a risk of activating other centres, resulting in decoherence and/or crosstalk between colour centres. To reduce this 'crosstalk' effect, colour centres and their respective wires may be placed further away from each other. However, this imposes a limit on the density of the colour centres within the material, which also affects the scaling of quantum systems to many colour centres.

Individual nuclear spins can be addressed by different microwave or radio frequencies. The spins can be selected by applying a field whose frequency matches the energy difference (or splitting) between the energy levels of the nucleus. The splitting frequency can be found via a frequency scan while, for example, fluorescence emitted from the nucleus is observed. When the applied frequency matches the slitting frequency a change in the emitted fluoresce can be observed, the change is often called a resonance. A resonance is sensitive to an external magnetic field if it has a non-zero angular momentum, as per the Zeeman effect.

The following description considers colour centres, which have various applications in quantum devices/systems (e.g. as qubits, quantum sensors etc.). Some existing quantum systems use different physical states as qubits or quantum sensors, such as ion traps and nuclear spin states as an alternative to colour centres. However, an ion trap requires surface electrodes for stability, and both ion traps and nuclear spins states are driven by much lower electromagnetic field frequencies (typically in the kHz-MHz range) than electron spin states of colour centres, in particular the resonance frequencies for nitrogen-vacancy colour centres (typically GHz). Electron-based systems experience a shift in their electron spin energy levels in dependence on an external magnetic field based on the electron gyromagnetic ratio (about 28 GHz/T), as described in further detail below, while nuclear-based systems experience a shift typically three orders of magnitude less, of the order of MHz/T. As a result one would need larger magnetic fields to separate the resonances in the nuclear spin case, which makes it impractical to apply a magnetic field gradient, as described in more detail below, for individual addressing in systems with high densities of nuclear spins. Furthermore the lower frequency of the electromagnetic signals for nuclear spin systems limits the rate at which spins may be addressed, which in turn limits the maximum achievable information throughput. The higher frequencies used to address colour centres mean that a greater number of addressing operations can be performed per second compared with lower frequency systems.

Despite several decades of colour-centre research, they still face challenges when it comes to individual addressing. Individual addressing of colour centres is a prerequisite in scaling single colour-centre-based sensors and qubits to more complicated sensor or qubit arrays that could, for example, be used for imaging arrays or quantum-computer chips.

A challenge of individual addressing lies in colour centres most often being addressed with microwaves-field-producing structures that radiate in a wide area. As a result, when the addressing of an individual colour-centre is attempted, the rest of the colour centres in its region are driven as well (albeit not as strongly) from the same microwave field, this results in decoherence and/or crosstalk between the colour centres, both unwanted properties for applications.

Herein, example wire geometries are described, which reduce crosstalk between colour centres by maximising the electromagnetic field applied to target colour centres to be addressed while minimising the electromagnetic field applied outside the target colour centres. This enables the scaling of systems based on colour sensors, such as multi-qubit arrays and colour-centre based sensors, to include more colour centres, providing a basis for more complex components such as imaging arrays and quantum computer chips.

The described geometries may optionally be combined with an additional solution, utilizing the innate magnetic-field dependence of colour centre energy-level transition frequencies (resonances) in combination with multiple colour-centre microwave-radiating geometries to address them individually. In combination with any of the described wire geometries, this significantly increases scalability (e.g. allowing closer spacing of colour centres and, moreover, allowing multiple colour centres to be addressed via the same wire).

Accordingly, described herein is a quantum system capable of addressing individual colour centres in an arrangement of multiple colour centres by creating a magnetic field gradient such that the magnetic field applied to different colour centres is different. This causes each colour centre to have a different electron spin resonance frequency, such that an electromagnetic field applied to the colour centre array only activates those colour centres having the resonance frequency of the electromagnetic field. This allows individual colour centres to be addressed without activating nearby colour centres.

For example, with the described wire pair geometry, the wire pair geometry acts to reduce crosstalk/decoherence effects between colour centres coupled to neighbouring wire pairs. The wire pairs may lie parallel to each other (such that each wire pair is substantially parallel to each other wire pair), and a magnetic field gradient may be created along the direction in which the wire pairs lie, acting to reduce crosstalk/decoherence between nearby colour centres coupled to the same wire pair. A combined effect of the geometry and the magnetic field gradient is that colour centres can be arranged in a relatively tightly-packed 2D grid.

In a further example or examples, this may be extended to a 3D grid, using a groups of wire pairs in a 'crosshatch' geometry (see the description of FIG. 8 below).

As mentioned above, a colour centre may be activated by applying an electromagnetic field at or sufficiently close to a resonance frequency of the colour centre, where the resonance frequency is a transition frequency between states or energy levels of the colour centre. The term 'electron spin resonance frequency' generally refers to a frequency that causes a transition in the colour centre between electronic spin states (generally at different energy levels). Each colour centre may have the same intrinsic resonance frequency or similar intrinsic resonance frequencies, increasing the risk that a signal intended for one colour centre inadvertently activates another.

Note that electromagnetic fields used to activate colour centres are oscillating electromagnetic fields which oscillate at a particular frequency matching a resonance frequency of a target colour centre. Other fields also described herein, in particular external static magnetic fields, which are applied to shift the energy levels and thus the resonance frequency of the colour centres. It should be noted that the component of an external magnetic field that is parallel to the colour centre axis is the effective magnetic field that causes a shift in the energy levels of the colour centre, while the component of an oscillating electromagnetic field that is perpendicular to the colour centre axis is the effective field for addressing the colour centre. It will be clear from the context which fields are referred to elsewhere in the description.

Example embodiments will now be described.

When an external magnetic field is applied to a colour centre, its resonance shifts in energy by a factor proportional to the magnetic-field projection along the colour-centre axis multiplied by the electron gyromagnetic ratio and a factor relating to the colour-centre spin. A transition between the colour-centre energy levels, which is necessary for quantum control, occurs only if the externally applied microwave-field frequency matches the transition-energy frequency of the colour centre under the applied magnetic field. By applying a magnetic-field gradient over a colour-centre array each colour-centre resonance can be shifted by a different frequency. If the frequency shift is sufficient to separate the colour-centre resonances by a factor, equal or bigger to half their full-width-at-half-maximum, individual colour centre can be addressed even if they are placed in a multiple colour-centre microwave-radiating geometry.

The application of the magnetic field can be achieved in many ways depending on the colour-centre array. For example, a single wire loop or wire loop system, e.g. carrying a non-alternating direct current (DC) to provide a static magnetic field, could be used to generate the magnetic field, or a Halbach array may be used to produce a homogeneous high-intensity magnetic field on one area and a low magnetic field intensity on another. In general, a magnetic field generator can take any form capable of causing a desired resonant shift (or shifts) in a colour centre (or centres).

The microwave-radiating geometry used to activate a colour centre (or centre) with a particular resonance frequency (or frequencies) can take many different forms, such as a single wire or a wire loop carrying alternating current (AC) or even a wire-number colour-centre surrounding geometry with parallel current flow, a crossed wire geometry, etc.

The following examples consider a quantum system comprising multiple colour centres. Specific examples refer to nitrogen-vacancy (NV) centres in diamond, but other types of colour centre may be used, such as silicon-vacancy in diamond. Colour centres may be present in other crystalline materials such as silicon carbide, for example. Colour centres can be naturally occurring in diamond and other materials, but can also be created by chemical vapor deposition (CVD) and high-pressure high-temperature (HPHT) techniques. Colour centres can also be placed at desired locations within diamond, by implanting ions inside the diamond (Nitrogen ions are implanted for nitrogen vacancy centres while silicon is implanted for silicon vacancy centres), or by irradiating a diamond with ultra-short (femto-second to pico-second) laser pulses. The description may refer to colour centres as qubits, but it will be appreciated the description applies equally to applications of colour centres other than quantum computing, such as quantum sensor applications.

FIG. 1 shows a schematic block diagram of a quantum system 100 of at least two colour centres, with the system having a mechanism for addressing each colour centre individually. A crystalline material 102, for example diamond, is shown, having two colour centres 104a, 104b. A typical colour centre in a diamond is a nitrogen-vacancy centre, which comprises a pair of a nitrogen atom and a lattice vacancy in the crystal. Although shown in FIG. 1 as a circle, each colour centre has an axis, which is the axis that aligns the nitrogen (or silicon, for example, for a silicon-vacancy centre) atom and the vacancy. The colour centres are positioned along a line 106. As mentioned above, a colour centre is addressed by an electromagnetic signal being applied to the colour centre at a resonance frequency of the colour centre. This signal is applied perpendicularly to the axis of the colour centre. FIG. 1 shows an electromagnetic signal emitter 108 generating an electromagnetic signal at a frequency F. For NV centres, resonance frequencies are in the microwave range and the electromagnetic signal emitter 08 emits microwave radiation, while other frequency ranges may be appropriate for other types of colour centre. The electromagnetic signal emitter 108 may for example take the form of a wire (or wires) coupled to a controllable current source.

There are multiple possible methods of generating an electromagnetic field for activating the colour centres. One example is by running an alternating current in a copper wire to generate an electromagnetic field of the desired frequency. Another possibility is printing wires on top of (or within) a diamond or other crystal substrate such as silicon carbide using lithography techniques. A third possibility is to irradiate diamond with a high-intensity ultra-short laser pulse which leads to graphitisation of the diamond, where graphite is conductive and can therefore act as a wire, and carry a current for generating the required electromagnetic field. A wire may therefore be internal or external to the crystal, and the terminology encompasses a variety of physical structures. In general, a wire refers to a carrier of an electrical signal that can operate as an electromagnetic field emitter.

In order to address each colour centre individually, a magnetic field generator 110 (external to the crystal 102) is used to produce a magnetic field which is applied to the colour centres 104a, 104b. The term 'magnetic field' gradient in relation a spatially-varying (that is, a magnetic field whose magnitude and/or orientation varies with location). A magnetic field may or may not be time-varying. As described in more detail with reference to FIG. 3, the application of a magnetic field along the axis of a colour centre causes a splitting of the energy levels of the colour centre, which changes the associated resonance frequency (or frequencies) of the colour centre. The degree of splitting of energy levels depends on the generated magnetic field, such that a higher magnetic field intensity creates a larger split between the energy levels. The magnetic field generator 110 is therefore configured to generate a varying magnetic field, such that the intensity of the fields applied to each colour centre is sufficiently different to cause the colour centres to have different resonance frequencies. The frequencies should be separated by some minimum amount to ensure no overlap between colour centres which is dependent on the material 102 and the colour centres used, as described later. As shown in FIG. 1, the magnetic field generator causes a magnetic field B1 to be applied to the colour centre 104a, which leads to a resonance frequency F1, while a different magnetic field B2 is applied to colour centre 104b, causing the colour centre to have a resonance frequency 104b.

The description refers to different magnetic fields (such as B1 and B2) at different locations in the interests of consciousness. More precisely, to provide individual addressability, the projection of the magnetic field onto the colour centre axes at those locations may be different (e.g. if the colour centres have mutually parallel axes, this could be achieved with a magnetic field whose magnitude is different at those locations, but also with a magnetic field whose orientation is different at those locations). There may be references herein to different magnetic field projections at different locations, and it will be appreciated that one of those magnetic field projections may be zero or substantially zero.

Unless otherwise indicated or context demands otherwise, the term 'resonance frequency' in the following description refers an electron spin resonance frequency, with resonance occurring between energy levels of the electron spin states of the colour centre. As mentioned above, the magnetic may be applied along the axis of the colour centre. However, this is not a requirement in general; a magnetic field that is not parallel to the colour centre axis will still be able to active the colour centre if the projection of the magnetic field onto the colour centre axis has sufficient magnitude.

There are multiple possible ways to generate a varying magnetic field, for example by generating a current within an arrangement of wire loops (coils) or, in a more complex configuration using a Halbach array to produce a high-intensity magnetic field in one area and a low-intensity magnetic field in another.

The quantum system 100 is operable to address individual colour centres 104a, 104b by controlling the frequency of the field generated by the electromagnetic signal generator 108. As shown in FIG. 1, when a signal of frequency F is generated, where F is equal F1 to the resonance frequency of colour centre 104a, this colour centre is activated while the other colour centre is not, since its resonance frequency is different to the frequency of the emitted signal. Note that the description refers to a single resonance frequency associated with a colour centre. In reality, a colour centre can have multiple resonance frequencies associated with transitions between different pairs of energy levels, but for ease of understanding, the description focusses on one transition and one resonance frequency for each colour centre.

The selective activation of individual colour centres allows such an arrangement to be used, e.g., for quantum computing applications, where each colour centre operates as a qubit, which allows arrays of multiple colour centres to implement multi-qubit gates.

Figure 2:
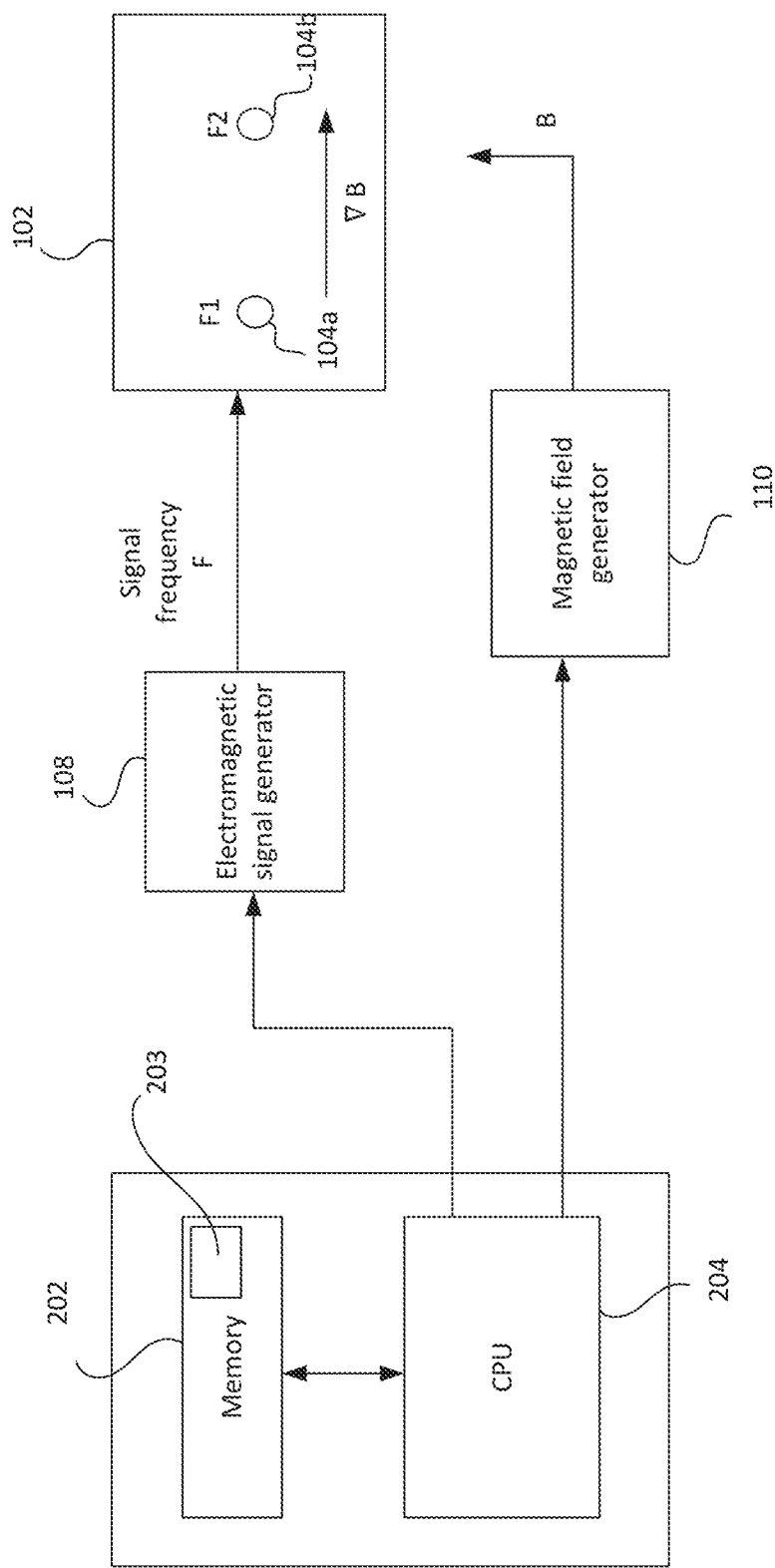
FIG. 2 is a schematic block diagram showing the control of a quantum system by a computer system.

FIG. 2 shows a schematic block diagram of a quantum system having a 'classical' (non-quantum) computer processor 204 (or processors) coupled to a memory 202 (or memories) as well as the magnetic field generator 110 and the electromagnetic signal generator 108 in order to control the activation of colour centres. For example, the classical processor 204 may be caused to implement a quantum computer program in the crystal 102 based on 'classical' (non-quantum) computer program instructions 203 which can be held in the memory 202. When these instructions 203 are executed, the processor 202 is configured to generate an electromagnetic signal of a particular frequency to enable activation and control of an individual colour centre, for example as a qubit. Multiple electromagnetic signal generators may be implemented and the processor in this case is configured to generate a respective signal at each electromagnetic signal generator 108, which allows multiple colour centres 104a, 104b to be activated and controlled independently as described above. This enables more complex operations to be carried out, including quantum gates comprising multiple qubits. A program to be implemented on a quantum computer comprising a set of qubits implemented by colour centres can therefore be effected by executing conventional computer instructions on the computer processor 204 to control the electromagnetic signals required to activate individual qubits according to the quantum program.

FIG. 3A is a schematic diagram showing the splitting of energy levels of a colour centre in the presence of an external magnetic field. The left side of FIG. 3A shows an example energy level structure for a colour centre, for example the ground state of a nitrogen-vacancy centre. This contains three spin states: $m_s=0$, having antiparallel spins, at a first energy level $L_0$, $m_s=+1$ and $m_s=-1$, which have two up spins or two down spins, respectively, are shown at the same energy level $L_{\pm 1}$ on the left. Note that, since energy and frequency are directly related, the levels $L_0$ and $L_{\pm 1}$ are labelled by frequency values. In an NV centre, $L_0$ and $L_{\pm 1}$ are split by a frequency of 2.87 GHz, so a transition between the 0 state and either the +1 or -1 state can be triggered by an applied microwave field of 2.87 GHz.

The right of FIG. 3A shows the energy level structure of a colour centre in the presence of an external magnetic field B. The magnetic field in the direction of the colour centre axis causes a split between the $m_s=-1$ and $m_s=+1$ levels, but does not affect the energy level of the $m_s=0$ state. As shown in FIG. 3, $m_s=0$ is at the same energy level $L_0$, as the 0 state is unaffected by the external magnetic field. However, the +1 and −1 states split, with the distance between the energy levels being directly proportional to the external magnetic field. This phenomenon is known as the Zeeman effect, which affects the resonance frequency of spin states having a non-zero angular momentum. The $m_s=−1$ state is then at a new energy level $L_{−1}$ and the $m_s=+1$ state has an energy level $L_{+1}$. The change in frequency of the energy levels in response to the magnetic field is directly dependent on the magnetic field B. The splitting between +1 and −1 energy levels in the presence of the external magnetic field is $2\gamma B$, where $\gamma$ is the electron gyromagnetic ratio, which is a known constant with a value of approximately 28 GHz/T. The higher the applied magnetic field, the larger the split between the +1 and −1 energy levels. In this case, the resonance frequency for the transitions between the $m_s=0$ state and the $m_s=−1$ state has a different value to the resonance frequency for the transition between the $m_s=0$ state and the $m_s=+1$ state. Either one of these pairs of states can be chosen for example for use as a qubit. References herein to a resonance frequency of a colour centre could refer to a resonance frequency matching either one of these pairs of states.

Figure 3B:
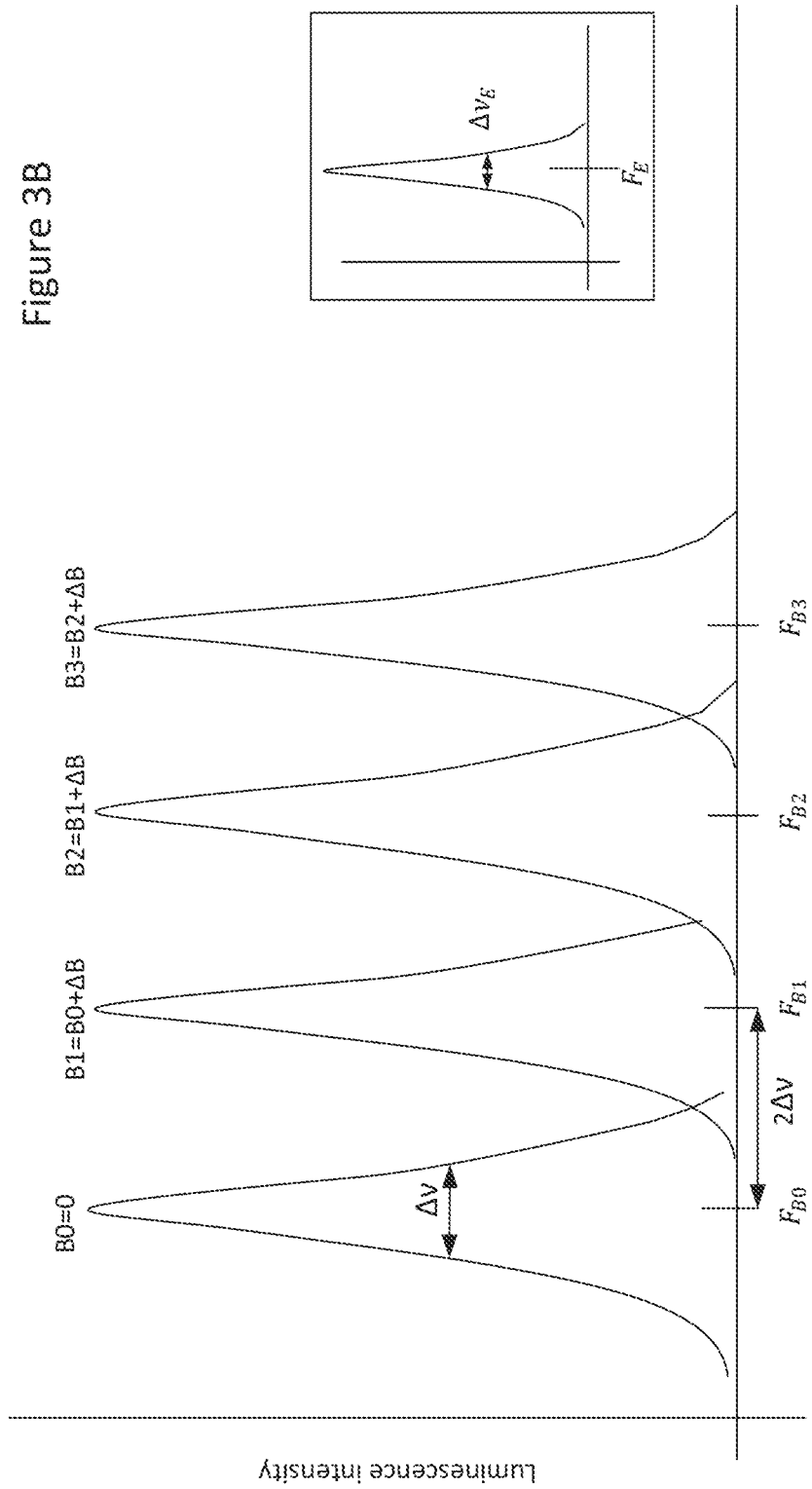
FIG. 3b shows a graph of resonance frequencies for different applied magnetic fields.

FIG. 3B shows an example plot of resonant frequencies for colour centres in the presence of different external magnetic fields. The resonance frequency for a colour centre can be measured and such a plot can be generated by measuring the intensity of luminescence of the colour centre for different frequencies of electromagnetic radiation, where the luminescence intensity has a sharp peak at the transition frequency of a pair of spin states. As mentioned above, there are multiple possible pairs of spin states for which a transition could occur, but the present example only describes resonance frequencies for one such pair, for example the $m_s=0$ and $m_s=+1$ states. As shown in FIG. 3B, in the absence of an external magnetic field, the luminescence has a resonance at a first frequency $F_0$. For nitrogen vacancy in diamond, this frequency is about 2.87 GHz. The curve shown in FIG. 3B increases sharply around this frequency. In order to address different colour centres individually by ensuring the different colour centres are activated by different resonance frequencies, it is important that the resonance curves associated with the different colour centres do not overlap to a point where the resonance frequency of the first colour centre might also activate the second colour centre or vice versa. The width of each curve can be characterised by a measure known as the full width at half maximum (FWHM), where this has been measured for different colour centres for applied electromagnetic radiation under different conditions. While the FWHM $\Delta v$ depends on factors such as the quality of the crystal material and the power of the electromagnetic radiation, a typical value for nitrogen vacancy centres in high-quality diamond is 100 kHz. To ensure separation between different colour centres, a difference in magnetic field that causes at least a 200 kHz ($2\Delta v$) is sufficient. The transition frequency for a colour centre for a given external magnetic field B is given by:

$$\Delta F = F_{B3} + \gamma B,$$

where $F_{B0}$ is the transition frequency for the given colour centre at zero external magnetic field, and $\gamma$ is the electron gyromagnetic ratio. The difference in transition frequencies between colour centres in the presence of different external magnetic fields $B_1$, $B_2$ is therefore:

$$\gamma(B_1 - B_2).$$

Setting this frequency to 200 KHz, the change in magnetic field that is required between each colour centre to enable individual addressing is easily calculated as approximately 7 μT.

However, in an effect not shown in FIG. 3B, the resonance frequencies of colour centres are also affected by nuclear spin states, which cause an effect called hyperfine splitting, leading to three peaks for a given colour centre at a given external magnetic field instead of one. These effects have been observed and are well known from experiments. A hyperfine splitting of approximately 2 MHz can be observed for nitrogen vacancy centres having a $^{14}N$ atom. To avoid any overlap between energy levels of different colour centres caused by hyperfine splitting, the frequency difference between different colour centres can instead be set to approximately 6 MHz, which, according to the formula above, leads to a required difference in magnetic fields of approximately 0.2 mT between each colour centre. Alternatively, nuclear polarization techniques can be used to deplete two of the three hyperfine-split resonances. The electromagnetic field applied also has an associated width, which for continuous fields is dependent on the line width of the electromagnetic field source, such as the wire in the examples described herein. This is shown in an inset of FIG. 3B, where an electromagnetic field having a given frequency $F_E$ in fact spans a range of frequencies having a width $\Delta V_E$.

The electromagnetic fields used to address colour centres may be applied as continuous fields or in the form of a pulse (i.e. a field of short duration). Different applications require different types of fields to be applied. In the case of DC metrology the above considerations are enough to determine a separation of the colour centre resonances. However, for applications using pulsed electromagnetic fields, such as pulsed metrology and pulsed qubit control, the width of the applied magnetic field should also be considered. For example, a pulse in the order of time t pulse width would result in a broadened linewidth of about $\Delta f \sim 1/t$. Typical examples of pulse widths for colour centres can range from tens of nanoseconds to a few microseconds, meaning that this effect may result in peak separations of 10s of MHz for the smaller pulse widths or 100 kHz for longer ones in order to ensure that a field pulse targeting a given colour centre's resonance frequency does not overlap with the resonance frequency of another colour centre.

The determined magnetic field difference between each colour centre that needs to be individually addressed is used to configure a magnetic field generator such as one or more coils carrying an electric current, to generate a magnetic field gradient, which varies along an array of colour centres at a rate of at least $\Delta B$/centre. The density of colour centres in the given crystal material can be used to determine the minimum variation of magnetic field with distance in the direction of the magnetic field gradient.

FIG. 4 shows a schematic diagram of a nitrogen-vacancy centre in diamond, one example of a colour centre that can be activated and controlled according to the methods described above. Diamond comprises carbon atoms that has a diamond cubic crystal structure. In diamond, natural defects occur where the lattice structure becomes irregular, or one or more atoms are added to or substituted for the carbon atoms in the lattice. The nitrogen-vacancy centre consists of a nitrogen atom 400 substituting one of the carbon atoms 402 in the crystal structure, and a lattice vacancy 404 (an absence of an atom within the crystal structure). As shown in FIG. 4, an extra electron 406 is located at the vacancy site. As mentioned above, NV centres are naturally occurring but can also be created using chemical vapor deposition and high-pressure high-temperature techniques, as well as by implanting ions in the diamond or by irradiation of the diamond by ultra-short laser pulses. The axis of the NV centre is the axis along which the nitrogen atom and the vacancy lie. As mentioned above, for control of the colour centre, when the colour centres and the electromagnetic signal generators (e.g. wires) are arranged such that the electromagnetic field is perpendicular to the axis of the colour centre, this allows the field to optimally drive the colour centres, since the component of the field perpendicular to the colour centre axis is the effective field that activates the colour centre.

Colour centres in a diamond lattice are not randomly oriented, their orientations are limited due to the structure of diamond. Because of the crystalline structure of diamond, one can encounter four different orientations of, for example NV colour centres, in diamond. These four orientations repeat throughout the sample so the position in terms of coordinates inside the diamond is not important. However, it is possible to preferentially grow one of the four possible orientations so the optimum case can be considered where all of the colour centres will point along the same axis.

After having all the colour centres created aligned along an axis the diamond can be cut along different planes, typically {100}, {110} or {111}. If a diamond is cut along the {110} set of planes, then one can have colour centres orientated parallel to the diamond surface. {111} results in colour centres whose axes are perpendicular to the diamond surface and {100} will result in colour centres that are 45 degrees oriented with respect to the diamond top surface. For diamond, the colour centre is aligned with one of three crystallographic planes or 'cuts': (111), (110), (100). Different cuts may be used for different wire configurations (for example where the wires are lithographically printed onto the diamond) to ensure that the electromagnetic field is applied optimally with respect to the axis of the colour centre. For wires that are created inside the diamond, such as by ultra-short (femtosecond) laser irradiation, rather than printed on the surface of the diamond, there is more flexibility in that wires can be placed in specific locations and along specific directions relative to the colour centre axis. This also allows for 3D geometries of colour centres controlled by wires at different depths within the crystal.

The spin state of a colour centre can be initialised by laser irradiation. For nitrogen-vacancy centres, for example, the state of the colour centre can be initialised by an optical process of exciting the spin state which later decays to the ground state $m_s=0$. FIG. 4 also shows a microwave signal used to control the NV centre by changing the electron spin state of the centre, where the microwave signal has the same frequency as a transition frequency between e.g. the $m_s=0$ and $m_s=+1$ states. The spin state of the NV centre can be 'read out' by measuring the intensity of the photoluminescence of the centre, which is dependent on its spin state, where the ground state emits more photons (higher intensity) than the $m_s=\pm1$ states.

FIG. 5 shows an example arrangement of colour centres in a 2D array, with multiple colour centres positioned along a set of vertical wires 500. As shown by a set of arrows, a varying magnetic field is applied to the system, with a greater magnetic field at the top of the array and a smaller magnetic field at the bottom, such that each colour centre along the vertical wire 500 experiences a different magnetic field. The component of the magnetic field applied parallel to the colour centre axis is the effective field that causes the energy levels of the colour centres to be shifted, so the required magnetic field determined for each colour centre of the given configuration should be applied parallel to the colour centre axis, or the magnetic field should be adjusted to ensure the component of the external magnetic field parallel to the colour centre axis is the determined magnetic field required to adjust the resonance frequency of the given colour centre by the required amount.

The external magnetic field is a static field applied in the direction parallel to the colour centre axis. As mentioned above for the specific example of NV centres in diamond, the required magnetic field gradient to ensure independent addressing of colour centres can be calculated depending on the transition frequencies of the spin states of given colour centre. For the example shown in FIG. 5, the magnetic field gradient is implemented such that the magnetic field is the same at all points along the same vertical height, i.e. the field only varies along the vertical axis. This can be achieved using a wire loop or a system of wire loops carrying an electric current, such as a Helmholtz coil. For example, a Halbach array can be used to generate a magnetic field with high intensity in one area and low intensity in another. The magnetic field in FIG. 5 is shown by the arrows that progressively decrease in size to illustrate the gradient, where the highest magnetic field is shown by a large arrow and the smallest magnetic field is shown by a small arrow, the arrows indicating the direction of the external magnetic field.

Since each colour centre along a given wire 500 experiences a different magnetic field, the resonance frequency of each colour centre 104 along each wire 500 is different. The resonance frequency for each colour centre can be calculated based on the known magnetic field at that centre according to the formula described above. A given colour centre 104 can then be addressed by running an alternating current along the wire 500 so as to create an electromagnetic field having the same frequency as the resonance frequency of that colour centre 104, while the other colour centres are not affected by this field due to the separation of the resonances by the magnetic field gradient. In this way, the full array of colour centres can be addressed individually with only one wire per 'column'. A current can be run through neighbouring wires that produces a different frequency so as to activate a different colour centre positioned close to that wire. More than one colour centre in a given column can be addressed by multiplexing, i.e. simultaneously generating multiple electromagnetic fields from the same wire, each having different frequencies corresponding to the multiple respective frequencies of the colour centres to be addressed. The strength of the electromagnetic field is strongest near to the wire, and reduces with distance from the wire. To ensure that the field generated by one wire only addresses those colour centres closest to that wire, the wires and colour centres are separated from wires and colour centres of the next 'column' by a minimum distance such that the electromagnetic field is sufficiently weak that it doesn't cause an activation of colour centres at neighbouring wires. One can set a threshold rate below which it would be acceptable to activate other colour centres. For example, it may be determined that if an operation can tolerate 1% error and it requires 100 operations done with the electromagnetic field, the amplitude the other colour centres see should be less than $\frac{1}{10000}$ of the amplitude of the field of the target colour centre.

Certain configurations of wires will now be described which are designed to reduce crosstalk between colour centres by limiting the fields produced by the wires which are intended to activate local colour centres only. For these configurations, more dense arrangements of colour centres are possible, enabling the scaling of colour centres to create larger quantum systems such as quantum computers and quantum sensor arrays.

The example colour centre array shown in FIG. 5 generates a magnetic field that flows in a clockwise direction when viewed in the direction of current flow. This field spreads out radially from the wire 500, with the strength of the magnetic field being inversely related to the distance from the wire 500. Therefore the strongest field for a given wire 500 is experienced by the colour centres adjacent to that wire. However, some field is still present at the next wire, which could lead to crosstalk or decoherence between colour centres, which is a problem for quantum computers and quantum sensors. One way to reduce this effect is to separate the wires and their respective colour centres by a minimum distance such that the electromagnetic field from neighbouring wires is weak enough not to affect the addressing of colour centres. However, this limits the number of colour centres that can be used in a given surface area of the crystal, presenting a problem when scaling to larger quantum systems requiring many qubits or quantum sensors.

Figure 6:
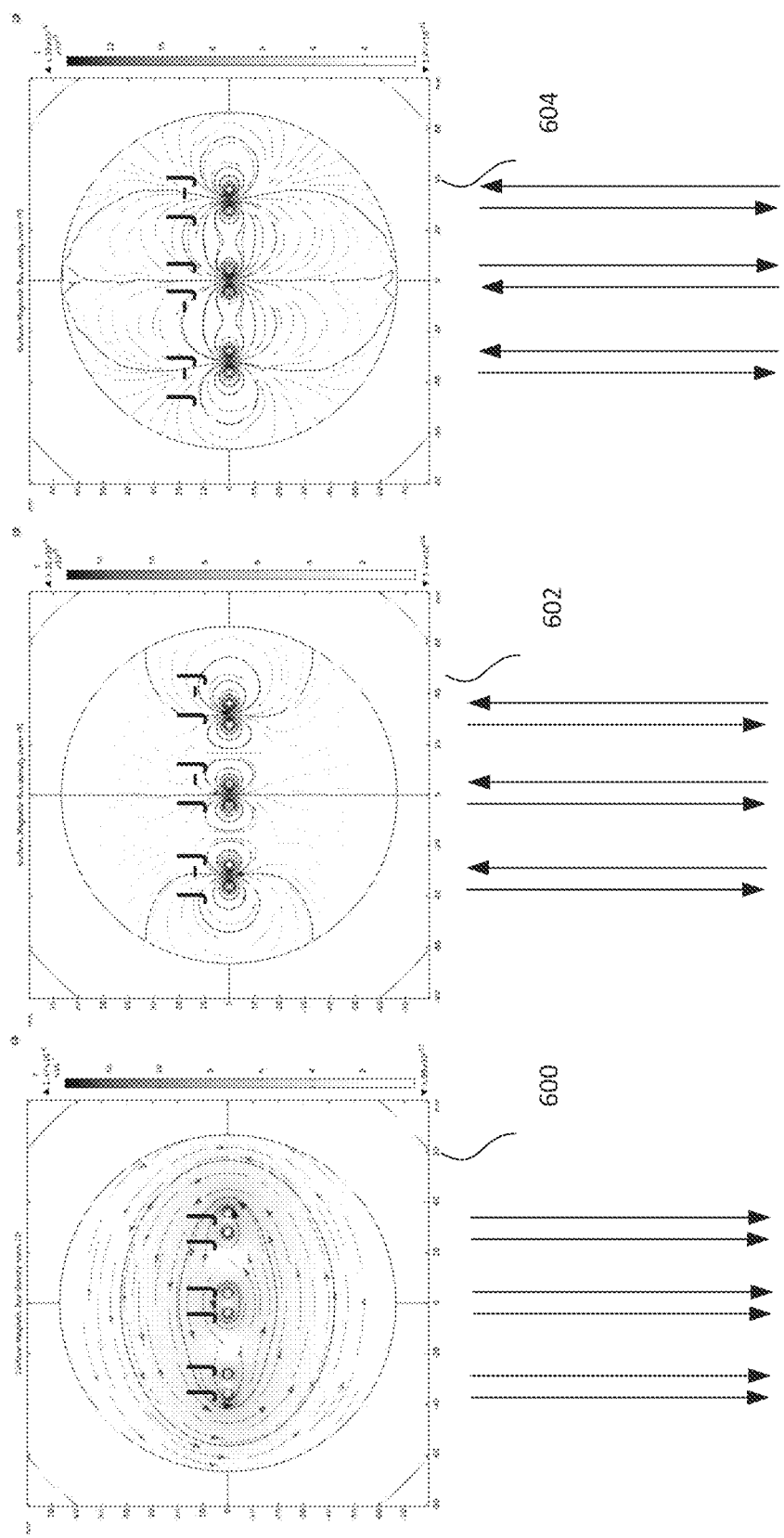
FIG. 6 shows a schematic diagram of the magnetic fields generated by multiple alternative wire pair configurations.

However, certain wire configurations can be implemented that enhance the field experienced by colour centres targeted by a given wire or set of wires while reducing the field experienced by other colour centres. FIG. 6 shows three example wire configurations that use wire pairs to generate different magnetic fields, some of which are especially suited to individually addressing colour centres in an array. Note that in the description below and in the diagrams of FIG. 6, the fields are shown as static fields as generated by a constant DC current along a wire 500 in a given direction. This is to illustrate the principles of how magnetic fields of equal amplitudes generated by current-carrying wires in different directions are combined. However, the resulting magnetic field patterns as shown in FIG. 6 are independent of the frequency of the field. In practice, the amplitudes and frequencies of the fields produced by the different wires are the same.

A first wire configuration and the resulting magnetic field is shown in plot 600. In this configuration, the current flows in a positive direction (outwards from the plane of the image), which would result, in the case of an individual wire, in a magnetic field directed counter-clockwise from the perspective shown in the plot, in accordance with well-known principles of electromagnetism. The direction of the current along the wires is also indicated by the set of arrows below the plot, with a downward arrow representing a positive current J. Note that J is used in physics to denote current density, but the term 'current' is used herein to refer interchangeably to either current or current density. Current density and current are directly related by the cross-sectional area of the current carrier (e.g. wire). Two wires both running the current in the same direction are placed beside each other, the counter-clockwise magnetic fields cancel in the region between the two wires and combine in the region outside the two wires, since the fields point in the opposite directions in the space between the two wires, and the fields point in the same direction in the region around the two wires. For the pair of wires, the total field scales with $1/r^2$ instead of $1/r$ for a single wire, which reduces the effects of that wire pair in regions far from the wire. Three pairs of parallel current carrying wires placed beside each other create an overall field that is weakest in the regions between the two wires of each pair, as well as between wires of neighbouring pairs, since the fields cancel out at these points due to the parallel currents.

The wire configuration shown in the middle plot 602 provides a magnetic field that is further localised to target areas, while reducing the field outside those regions. In this configuration, wire pairs are arranged with a first wire having a positive current and a second wire having a negative current. This is also referred to as an antiparallel arrangement, as the current density vectors are antiparallel, as shown by the arrows below the plot 602. As shown by the field lines, the magnetic field is strongest for this arrangement in the region between the two wires, since for a first wire running the current in a positive direction, the field points counter-clockwise, such that the field in the region between the two wires is directed upwards, whereas for the second wire of the pair, the current runs in a negative direction, so that the magnetic field is clockwise, and again the field between the two wires of the pair points upwards, leading to a stronger field in the region between the two wires of the pair. This arrangement can be applied with colour centres positioned in the region between pairs in order to maximise the field at the colour centre to enable addressing, with the field outside this region being less intense. The fields in the region between wires of neighbouring pairs also add to give a stronger overall field than if there were only a single wire pair, since the currents of the nearest wires for the two pairs are anti-parallel.

A third possible configuration is shown in plot 604. In this case, the two wires of each pair are arranged to carry currents that are antiparallel relative to each other but adjacent wires belonging to different pairs carry parallel currents. This causes the fields between wires of the same pair to be added, since the antiparallel wires produce fields that have the same direction in the region between the wires, while the field between the pairs cancels out as adjacent wires of neighbouring pairs have the same direction of current, and the fields have the opposite direction between the two wires, i.e. at the halfway point between any two pairs of wires in the configuration. This configuration provides the most effective localisation of the field to desired regions while minimising the field experienced between the wires, which reduces the risk of crosstalk and decoherence for a set of colour centres placed in the region between the two antiparallel wires of each pair.

Reference numerals 612, 614, 616 and 618 denote first, second, third and fourth wires respectively (wires 1 to 4, shown in cross section). For simplicity, the description refers the same wires 612, 614, 616, 618 in respect of each configuration 600, 602, 604. The geometric arrangement of wires 1 to 4 is the same between those configurations 600, 602, 604; wires 1 to 4 lie substantially parallel to each other in this example, with wires 1 and 2 (612, 614) forming a first wire pair, and wires 3 and 4 (616, 618) forming a second wire pair. It is not a requirement for the wires to be parallel in general. To achieve the beneficial effects set out above, the wires of a given wire pair need only be reasonably sufficiently parallel to each other to generate the desired form of magnetic field.

The localization effect is caused by a combination of constructive and destructive wave interference. Each wire carrying an alternating current emits an oscillating electromagnetic field. With a pair of wires carrying antiparallel currents of substantially equal magnitude, constructive interference between their respective magnetic fields occurs in a region local to the wire pair, strengthening the magnetic field. Outside of the local region, destructive interference occurs (with the electromagnetic magnetic fields 'cancelling out', at least to an extent), reducing cross talk and decoherence effects between colour centres located adjacent (or otherwise coupled to) different wire pairs. In the present example, each wire pair—including the first wire pair (612, 614) and the second wire pair (616, 618)—acts as a single signal carrier.

In the second and third arrangements 602, 604, to address a colour centre coupled to a given wire pair, both wires of the given wire pair are activated with anti-parallel currents, each at or approximately at the resonance frequency of the colour centre, resulting in a single, localized electromagnetic activation signal at or approximately at the colour centre resonance frequency (and whose magnetic field component along the colour centre axis thus causes the desired energy transition in the colour centre).

In the third configuration 604, the second wire 614 of the first wire pair (612, 614) neighbours the third wire 616 of the second wire pair (616, 618), in that no other wire is located in the region between the second and third wires, and those wire pairs are supplied with currents flowing antiparallel relative to each other, and in antiparallel to the currents in the other wire of their respective wire pairs (the first wire 612 and the fourth wire 618 respectively). This results in set of a (+J, −J, +J, −J) currents through the four wires (where J could be positive or negative), achieving maximal localization.

Figure 7:
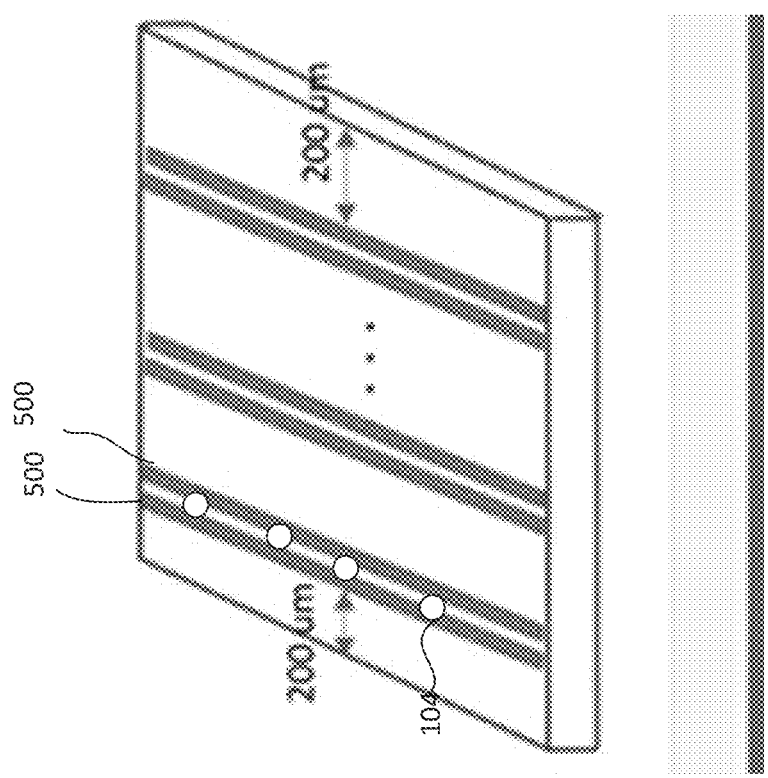
FIG. 7 shows an example colour centre array with a wire pair configuration.

FIG. 7 shows an example wire configuration suitable for addressing a 2D array of colour centres 104, comprising multiple pairs of wires 500, each pair separated by a distance of 200 µm. Note that the distance needed between wire pairs is dependent on the properties of the wires and the strength of the generated field. However, as described above, wire pair configurations cause the field outside the wire pairs to reduce more quickly than the field for a single wire, in particular for antiparallel wire pairs, thus reducing crosstalk between colour centres. Therefore, for the configuration shown in FIG. 7, colour centres can be placed in more tightly packed rows along the wire pairs than is possible for a single wire configuration as shown in FIG. 5 without causing crosstalk or decoherence.

In addition to reducing crosstalk between wires/colour centres, certain wire configurations can be used to enable individual addressing of colour centres by controlling the electromagnetic signals used to activate the colour centres such that only one colour centre is addressed by a particular signal implemented within the wire configuration.

Using specialized geometries one can apply certain electromagnetic fields, for example circularly polarised fields only at specific target points (or lines) instead of bigger volume area. One example application in which circular polarisation is useful is in the use of colour centre for magnetometry, i.e. detection and measurement of magnetic fields. The use of such specialised geometries allows only those colour centres placed at specific points (or lines) to experience the circularly polarized field and measure magnetic fields with optimum efficiency in this case.

One example configuration is an array of crossed wires, comprising a grid of vertical and horizontal wires, with an array of points at which the two wires cross. The system is arranged such that a colour centre is placed adjacent to each crossing point, for example directly below or above the crossing point, with each colour centre being addressable by the field generated at that crossing point, as described below. Note that, as described below, the field generated at the crossing point affects all colour centres that are equidistant from the two wires that cross at that cross point. The term 'adjacent' is applied herein to a given crossing point if it is positioned such that it is addressable by a field generated at that crossing point, so 'adjacent' herein refers to colour centres that are sufficiently close to the x-y position of the cross point to be addressed by the field at the cross point, as well as colour centres at those points along the lines equidistant to both wires. Note that the spatial accuracy of the signals generated by the wire in addressing colour centres is dependent on the linewidth of the generated signals and the frequencies of the colour centres being addressed. In a 3D configuration, described later with reference to FIG. 9, multiple colour centres are placed along the z-axis, at the same (x,y) coordinate as a given crossing point, where the field generated at that point is used to address any (or all) of those colour centres. Each of the two wires produces an electromagnetic field of a certain amplitude, phase and direction which interfere with one another. The electromagnetic field from the two wires propagates outwards with decreasing amplitude and an oscillating phase in time (given by the frequency of the field). The direction of the electromagnetic field is given by the propagation direction of the current inside the wire that is generating the field.

The above description refers to addressing of colour centres by emitting a signal of the resonance frequency of that colour centre, where the colour centres have different resonance frequencies due to the application of a magnetic field gradient. However, a crossed wire configuration allows more complex manipulation of individual colour centres without applying the same manipulation to other colour centres along the same wire(s). This allows straightforward addressing of individual colour centres arranged in a 2D array with crossed wires by generating a combination of signals at the different wires such that the desired field or combination of fields is only produced at the crossing point(s) corresponding to the colour centre(s) to be addressed, for example by generating a combination of signals that generates a circularly polarised field only at the crossing point.

At a point of interference if the fields have the same amplitude, a phase difference of $$\frac{\pi}{2}$$

and direction perpendicular to one another then the produced field will be circularly polarized. A crossed wire geometry makes it so that each equally distant point between the wires fulfils this conditions. For example, underneath the cross-point between the two wires the fields are pointing perpendicular to one another but as one moves laterally away from the cross-point (parallel to one of the wires) the field from one wire has the same amplitude, but the field from the other is reducing, thus the fields no longer have the same amplitude and the direction of the field is "rotating away" from the cross-point direction, as the effect from the further away wire becomes negligible, and thus the resulting field is no longer circularly polarised.

Figure 10:
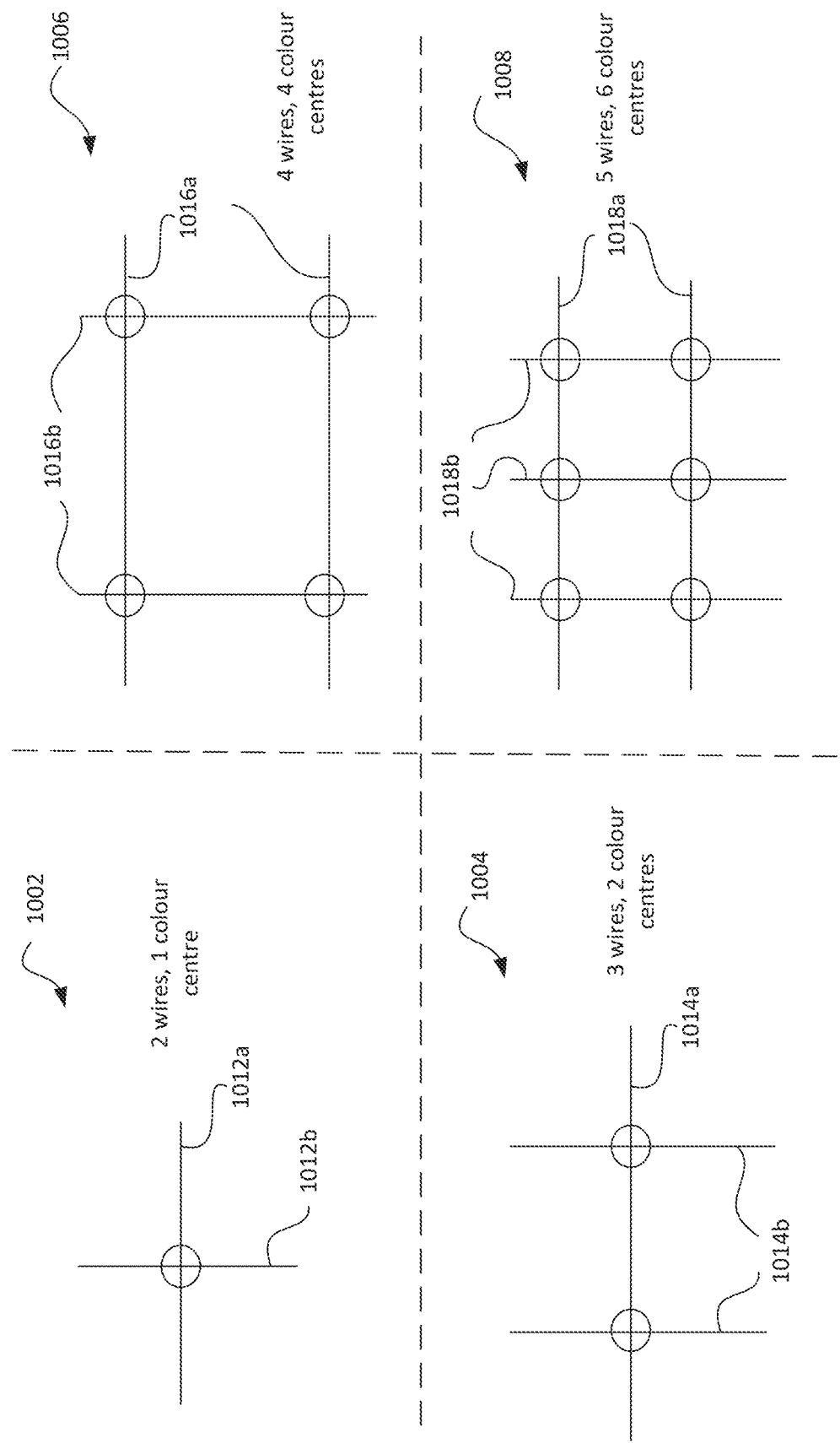
FIG. 10 shows a set of example crossed-wire configurations for addressing different numbers of colour centres.

A benefit of addressing individual colour centres by crossed wires is that for systems with two dimensional grids of six or more colour centres, fewer wires than colour centres are needed to implement individual addressing. The effect becomes more apparent for larger systems. For example, an array of one million colour centres arranged in a 1000×1000 configuration can be addressed by a grid of 2000 wires. FIG. 10 shows this effect for a one-colour centre arrangement 1002, two-colour centre arrangement 1004, four-colour-centre arrangement 1006 and six-colour centre arrangement 1008. To address a single colour centre by an effect produced by interacting fields at a crossing point, one crossing point is needed, which requires two wires 1012a, 1012b which are crossing, i.e. non-parallel.

Similarly, for the two-colour-centre arrangement 1004, three wires are required to construct two crossing points by which the two colour centres can be individually addressed. Two substantially parallel wires 1014b are crossed by a single non parallel wire 1014a, forming two crossing points adjacent to the two colour centres. Although the wire 1014a is shown as perpendicular to the wires 1014b, this is not a requirement.

For a four-colour-centre arrangement 1006, at least four wires are needed to create four crossing points by which four colour centres can be individually addressed. In the example shown in FIG. 10, two wires 1016a lie substantially parallel to each other, while a further two wires 1016b lie in the same plane each crossing both wires 1016a. For the four-colour-centre case, the same number of wires are required for a configuration in which colour centres are each addressed by a single wire. However, as discussed above, a potential problem with addressing colour centres by individual wires, e.g. a set of parallel wires each positioned closest to a different colour centre, is that a colour centre configured to be addressed by a particular wire can also be addressed (albeit less strongly) by nearby wires, causing decoherence and crosstalk. For crossed wires, as will be described in more detail below, the colour centres are addressed by field effects that are, by controlling the timing, amplitude and/or phase of the fields produced by the two associated wires, local to the crossing point only within the x-y plane, and therefore the effects of decoherence and crosstalk are minimised.

For a six-colour-centre arrangement 1008, in order to construct six separate crossing points for the six colour centres to be individually addressed, only five wires are required, two wires 1018a which are substantially parallel to each other, and three wires 1018b which are substantially parallel to each other and each crossing both wires 1018a as shown, with all wires lying in the same plane. For any system with a number of colour centres greater than six, the colour centres can be addressed by fewer wires than the number of colour centres. This allows the scaling up of a system of colour centres, for example for quantum computing applications, without requiring the number of wires to scale up proportionally, enabling systems with more colour centres to be implemented where the number of wires is limited, for example by spatial constraints or properties of the wires and/or the crystal material in which they are implemented.

The activation of colour centres by the crossed wires is described below.

Figure 8:
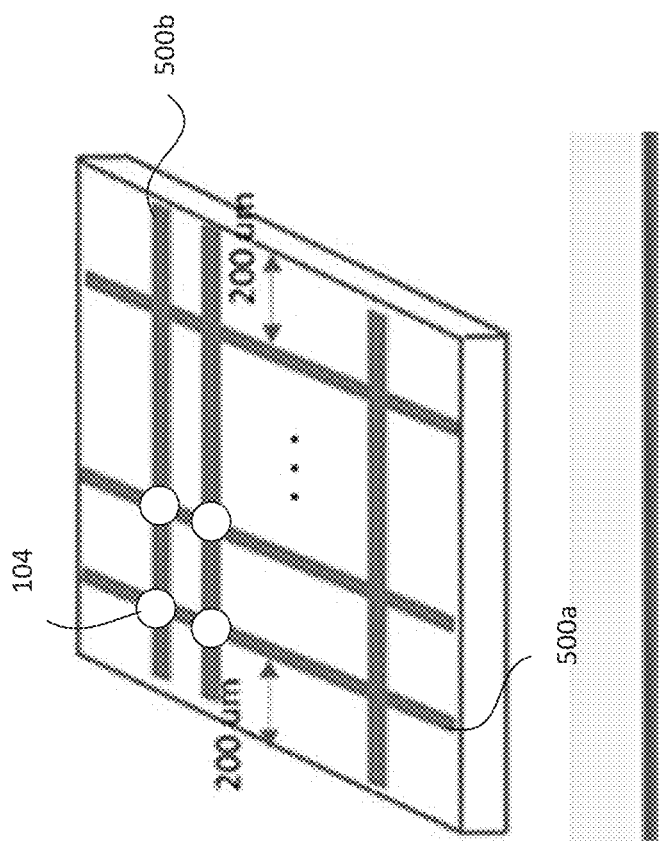
FIG. 8 shows an example colour centre array with each colour centre addressable by a pair of crossed wires.

FIG. 8 shows a schematic diagram of a colour centre array with wires 500 arranged in a crossed wire configuration, with each colour array positioned close to a crossing point of two wires. Each colour centre 104 is therefore associated with a different combination of two wires (or a different combination of two wire pairs—see below). Note that microwave fields generated by the wires as described herein may be applied as 'pulses', i.e. electromagnetic signals of very short duration. For applications like quantum computing and metrology, durations of applied electromagnetic fields typically vary from a few nanoseconds to a few microseconds for nitrogen-vacancy colour centres. By controlling properties of the fields generated by the wires, including phase, pulse timing and pulse duration, it is possible to produce a particular effect at one colour centre only.

One way to create a particular effect at one colour centre only is to time a sequence of pulses to be generated by the wires of the configuration, such that only the target colour centre experiences a particular sequence of pulses. Pulse sequences are used in quantum systems to manipulate electron spin states and prevent decoherence. One example pulse sequence is referred to as the XY8 pulse sequence, which comprises a repeating sequence of $\pi$ pulses, where $\pi$ pulses are pulses of a particular duration which cause a change of electron spin state. $\pi$ pulses are a well-known way to manipulate electron spin states and will not be described herein in detail. In the XY8 pulse sequence, the eight pulses alternate between $\pi_x$ and $\pi_y$, which are $\pi$ pulses (and thus have the same duration), that differ from each other by a phase of $$\frac{\pi}{2}.$$

The sequence consists of the following pulses:

$$\pi_x\text{-}\pi_y\text{-}\pi_x\text{-}\pi_y\text{-}\pi_x\text{-}\pi_y\text{-}\pi_x\text{-}\pi_y,$$

with a predefined gap of duration r between each pair of pulses.

In order to use such a sequence to address just a single target colour centre, the crossed wire geometry shown in FIG. 8 can be used to generate pulses having different phases at two wires that cross at the point closest to which the target colour centre is positioned. All pulses have the same frequency, which should be the resonance frequency of the target colour centres. Taking the plane of the crossed wires as the x-y plane, the colour centres are positioned at a position that is equidistant from both wires, for example at the respective (x,y) position of the crossed wires at a different height, e.g. below the crossed wire array. The wires labelled 500a and 500b in FIG. 8 cross only at the top left colour centre 104. If a first $\pi_x$ pulse is generated by the wire 500b, this pulse is emitted to all colour centres positioned along the length of that wire, and more weakly to colour centres at other wires. However, to generate a $\pi_y$ signal at the target colour centre at time $\tau$ later, a second pulse having a phase that differs from the first pulse by $$\frac{\pi}{2}$$

is generated by the wire 500b such that the pulse reaches the target colour centre at exactly $\tau$ time later. The distance that each given pulse has to travel and the colour centres and the speed of electromagnetic waves are known, meaning that the required time that the pulse needs to be generated by the second wire can be determined exactly. All other colour centres along the wire 500b experience the pulse $\pi_y$, but the pulse only reaches the target colour centre 104 at the time defined by the pulse sequence. This is repeated for all pulses of the sequence, with the pulses timed such that they reach the cross point at regular time intervals $\tau$.

Colour centres located at the cross point or at any point that is equidistant from the two wires along which the respective pulses were transmitted experience the effect of the pulse sequence. Since pulses have such short duration, the respective pulses reach other colour centres at different times, such that only the target colour centre receives the XY8 pulse sequence mentioned above, and therefore only the target colour centre's spin state is controlled according to that spin sequence.

Note that this method requires good control of the phase of the pulses generated by the respective wires, to ensure that the phases differ by the required amount to generate $\pi_x$ and $\pi_y$ pulses.

The XY-8 pulse is a pulse sensitive to phase. That is because it contains $\pi_x$ and $\pi_y$ pulses, which can be achieved with a phase shift. One can use similar techniques as described above for generating circularly polarised fields, with zero-phase difference between the fields from the two wires, to instead generate linearly polarized microwaves at the cross point. The frequency of the field corresponds to some wavelength, which in the case of 3 GHz is about 10 cm. At non-equally-distant points or points that are not spaced by an integer wavelength distance the field will be elliptically (or circularly) polarized instead. In typical implementations of quantum systems of colour centres in diamond, this wavelength is much higher than the distance between any colour centre and a cross point. The colour centres positioned adjacent to the cross-point experience the correct phase difference between the $\pi_x$ and $\pi_y$ pulses, while the other colour centres will experience an elliptical field.

Note that the method described above is just one example, and that other methods exist to manipulate and control the spin state of individual colour centres by controlling the fields produced by crossing pairs of wires 500 in the crossed wire geometry of FIG. 8. In the example above, the wires 500 are configured to generate electromagnetic fields whose phases differ by exactly $$\frac{\pi}{2}$$

only at the crossing point, leading to circularly polarised microwave fields at these points only, while outside these points, the fields are linear or elliptical. This can be used to control the spin state of the colour centres at the (x,y) position corresponding to that crossing point.

While circular or linear polarisation is one example effect that can be produced at the cross points, the principle can be extended to other cases as well. For example, since the field orientation is changing as one moves away from the equidistant lines, it will have an effect on the strength of the drive field for differently positioned colour centres. The drive is maximum when the magnetic field produced by the wire is perpendicular to the colour centre axis, so in the case where the colour centre axis is not perpendicular to the plane of the crossed wire geometry an effect can be observed. Timing between pulses could also be used, for example. If a sequence requires a pulse from wire 1 to be implemented first and then a pulse from wire 2 or a pulse is very sensitive to timing, the wires divide the host substrate into sections where the right conditions can be met or not. Note that the latter case is for electromagnetic field pulses produced by the wires and not for continuous wave applications. The crossed-wire geometry described above can also be used when consecutive operations separated by a specific time window are required, where the electromagnetic pulses are timed at two crossing wires such that the consecutive operations only occur at the cross point.

Quantum metrology and quantum computing both have applications utilizing similar pulses such as the pulse sequence described above. Crossed wire geometries are useful for producing these effects for individual colour-centres for both quantum computing and quantum metrology. An example quantum computing application is holonomic quantum gates, where an effect of polarisation can be produced at a cross point because of the phase relationship between the electromagnetic fields produced by the wires. To achieve this with the highest efficiency, the colour centres are placed either at equidistant lines or a multiples of a wavelength away. However, as mentioned above, for microwaves the wavelength is of the order of centimetres making it impractical for high densities of colour centres. In this example application the gates will therefore be selectively applied to the colour centres that are placed at equidistant points between the two wires.

Other methods may be used to control the spin state by controlling one or more of the phase, timing, and duration of the electromagnetic fields generated by the wires 500 of the crossed wire configuration shown in FIG. 8. Multiple colour centres can be addressed simultaneously by selecting the pairs of wires that cross at the positions of the target colour centres and generating pulses from these wires at the required timing to generate a field or pulse sequence that controls the spin state of those colour centres only.

The crossed wire geometry can be used to enable individual addressing of colour centres within the 2D x-y plane. Note, this 2D addressability can be achieved without the use of magnetic field gradients. This can be extended to three dimensions by introducing a magnetic field gradient $\Delta B$ as described above, to control the resonance frequency of colour centres positioned at different heights along the z-dimension, such that a pulse sequence generated at a crossing point at a given frequency is not only limited to colour centres at the same (x,y) position as the crossing point, but is also limited in the z-direction to the colour centre experiencing an external magnetic field such that its resonance frequency matches the frequency of the emitted pulses.

Note also that, whilst FIG. 8 shows single wires 500*a*, 500*b* for simplicity, the geometry of FIG. 8 can be combined with that of FIG. 6, by replacing each wire 500*a*, 500*b* with a wire pair, in which antiparallel currents (e.g., pulse currents) are selectively generated, to achieve addressability with reduced crosstalk/decoherence in 2D (without magnetic field gradients) or 3D (with a magnetic field gradient in the vertical direction). In this case, each colour centre is coupled to a unique pair of wire pairs (four wires in total, but with each wire pair acting as a single signal carrier).

The wires 500*a* and 500*b* are shown to be substantially perpendicular to each other, but in general it is sufficient for them to be non-parallel such that they cross each other (forming a cross point). The wires 500*a* and 500*b* are substantially straight, but this is not a requirement in general (in some cases, curved wires may cross each other more than once and thus form more than one cross point).

Figure 9:
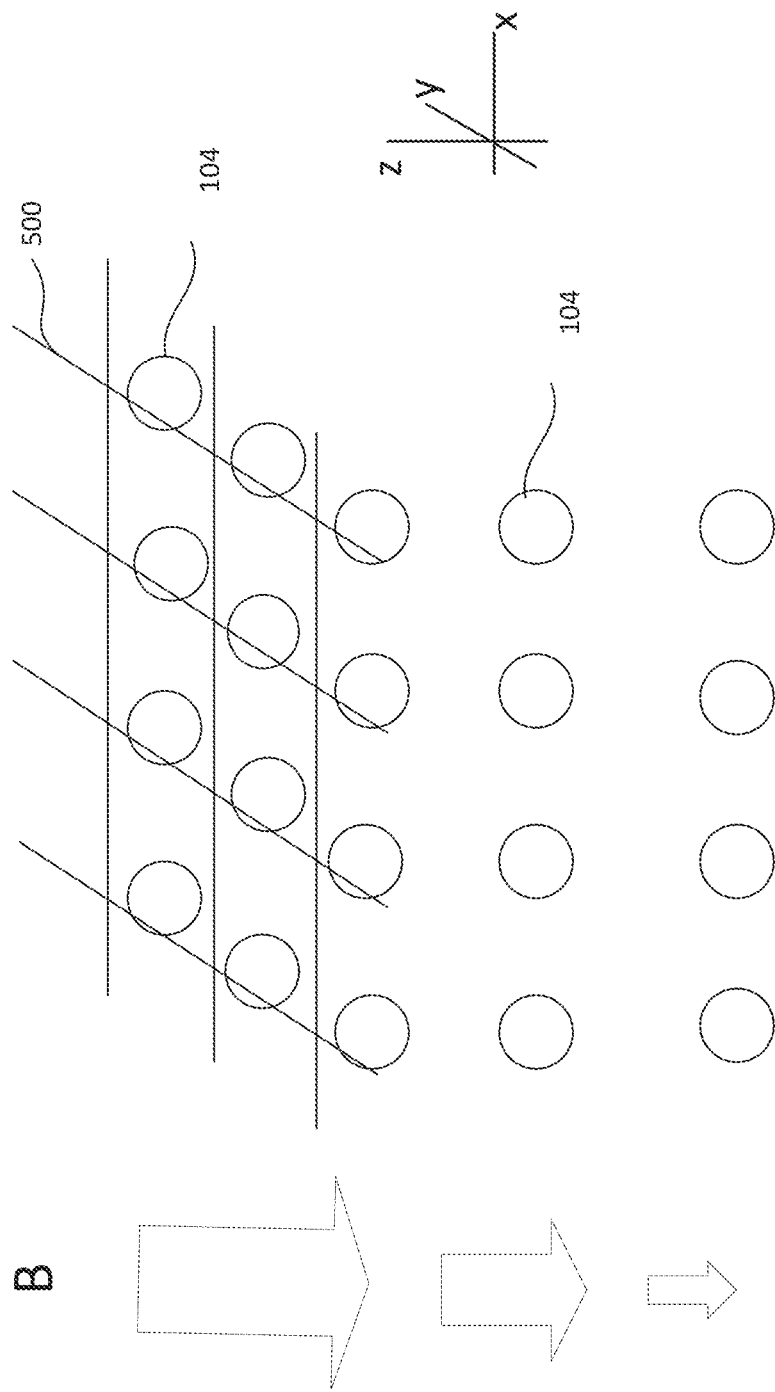
FIG. 9 shows an example 3D colour centre array with a magnetic field gradient and crossed wire configuration.

FIG. 9 shows an example 3D array having colour centres 104 arranged in a 3D array with a 2D crossed wire configuration layer above the colour centre array. For clarity, only one 'face' of the configuration is shown in the z-x plane to show the colour centres in three dimensions. In reality, the colour centre array comprises a colour centre at each position of the 3D grid. As described above, various methods can be used to generate electromagnetic field pulses from the crossed wires 500 of the configuration so as to address colour centres at particular x-y positions in a 2D grid. In 3D however, these pulses would also address colour centres at the same x-y position but at a different height. However, as described above, an external magnetic field gradient can be used to adjust the resonance frequency of the colour centres along the z-axis. This is shown in FIG. 9 by the arrows increasing in size with decreasing height. The magnetic field separates the spin energy levels of the colour centres so as to adjust the transition frequency to go from one spin state to another. The pulse sequence only affect colour centres having a resonance frequency matching the frequency of the pulses. This means that the pulse sequence generated at one of the crossing points only affects a colour centre at the (x,y) position corresponding to the position of the crossing point and at the z-position corresponding to the frequency of the pulses, enabling individual colour centres within the 3D array to be addressed without manipulating the spin of other surrounding colour centres in the same way.

FIG. 6 shows three 2D arrays of colour centres (layers) that are vertically stacked. In general, the 3D geometry can have two or more layers. The colour centres in different layers may be formed in different crystals, e.g. with the wires printed on the surface(s) of the crystals, or formed on the crystal surfaces (e.g. as graphene channels created on the surfaces). It is also possible to have multiple layers of colour centres in the same crystal, with the wires formed in the crystal itself (e.g. as graphene channels through the crystal).

The term magnetic gradient is used broadly to mean any spatially-varying magnetic field. the magnetic field can have many possible spatial configurations. Generally, if the magnetic field at a given colour centre in a given layer is different than the magnetic field at its closest colour centre in a neighbouring array (or, more precisely, the projection of the magnetic field onto their respective axes), that will be sufficient to functionally isolate those colour centres from each other. As already noted, the magnetic field may have a value of zero or approximately at one or a subset of colour centres (what matters is the relative difference in resonance frequencies between nearby colour centres, and thus the difference in the magnetic field projections at those colour centres).

Figure 11:
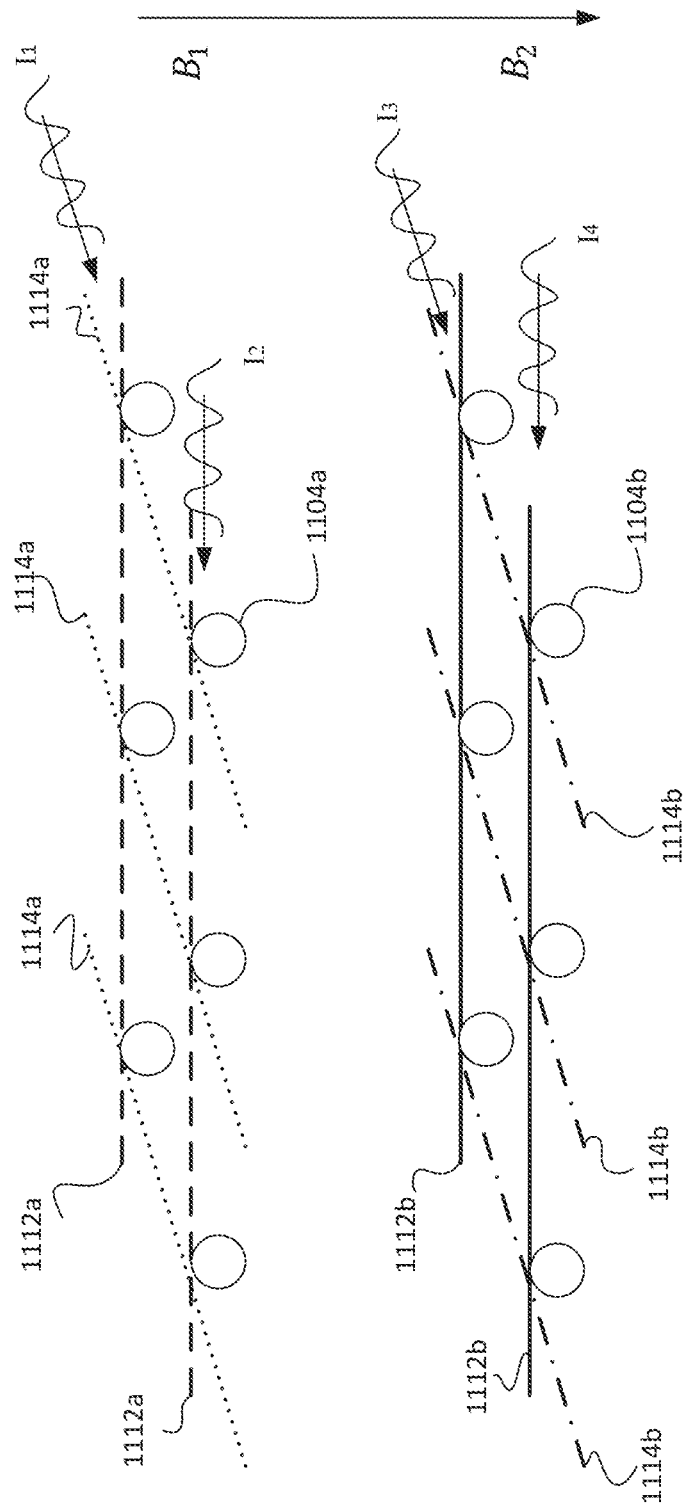
FIG. 11 shows an example 3D colour centre array having multiple layers of colour centres addressable by crossed wires.

FIG. 11 shows a schematic diagram of an example configuration of colour centres comprising two layers each having six colour centres, with a set of crossed wires lying in the plane of each layer according to the six-colour-centre configuration 1008 described above with reference to FIG. 10. The top layer has three wires 1114a lying substantially parallel to each other, and a further two wires 1112a lying substantially parallel to each other and each crossing each of the wires 1114a, to form a set of six cross points as shown. Six colour centres are positioned adjacent to each of the cross points. Similarly the bottom layer has a set of three wires 1114b all substantially parallel to each other and a further set of two wires 1112b which are parallel to each other and non-parallel to the wires 1114b such that they each cross each of the wires 1114b forming six cross points.

As mentioned above, sending pulses in a particular way along the crossed wires produces an effect that is localised to points that are equidistant between the two wires, such that neighbouring colour centres of the same layer are not addressed by a given field or combination of fields induced by a selected pair of wires. However, in a 3D configuration as shown, there is a risk of the field produced at a given cross point also addressing colour centres at the same x-y position (or that are otherwise equidistant between the two wires) in a different layer. As described above with reference to FIG. 9, this effect can be offset by generating an external magnetic field that varies along the z-direction as shown. As described above, different external magnetic fields projected onto the colour centre axis of different colour centres causes the colour centres to have different electron spin resonance frequencies. By generating a varying magnetic field such that a magnetic field $B_1$ is projected onto colour centres of the top layer and a different magnetic field $B_2$ is projected onto colour centres of the bottom layer, the colour centres of the top layer, e.g. colour centre 1104a, are addressable by fields of a first frequency $f_1$, and the colour centres of the bottom layer, e.g. colour centre 1104b are addressable by fields of a second frequency $f_2$ having frequency $f_2$. Therefore, if the cross point to which colour centre 1104a is adjacent generates a field (e.g. a pulse or pulse sequence as described above) at a frequency $f_1$, by running currents $I_1$ and $I_2$ along the two wires that cross at the cross point, it addresses only the colour centre 1104a, since the effect is localised only to that position in the x-y plane due to the effect of the crossed wires as described above, and only to colour centres of the top layer since only those colour centres can be addressed by the given frequency. A different colour centre of the bottom layer could be activated simultaneously by generating a field having a frequency $f_2$, as generated by currents $I_3$ and $I_4$ at that frequency.

Note that 'individual addressing' does not necessarily mean that only one colour centre is addressed at a given time. As mentioned above, multiple colour centres at different z-positions can be addressed simultaneously by generating electromagnetic field pulses of multiple frequencies simultaneously to match the respective resonance frequencies of the colour centres. Similarly, multiple colour centres in the same x-y plane may be addressed by generating pulses from multiple respective pairs of wires at the timings required according to the given method of addressing.

The first alternating current may cause the first wire to emit a first electromagnetic field, and the second alternating current may cause the second wire to emit a second electromagnetic field. The localized electromagnetic field may be created in the region adjacent the wire via constructive interference between the first electromagnetic field and the second electromagnetic field in that region and destructive electromagnetic field interference between the first magnetic field and the second electromagnetic field outside of that region.

According to one aspect of the present invention there is provided an apparatus comprising: a crystal; a wire pair formed of: a first wire adapted to receive a first alternating current, and a second wire adapted to receive a second alternating current substantially antiparallel to the first alternating current in the first wire, and located adjacent the first wire such that a localized electromagnetic filed is created in a region local to the wire pair via constructive electromagnetic interference between the first wire and the second wire in the region local to the wire pair and destructive electromagnetic field interference between the first wire and the second wire outside of the region local to the wire pair; and a colour centre located within the crystal in the region local to the wire pair.

According to another aspect there is provided apparatus comprising: a crystal; a wire pair formed of: a first wire connected so as to receive a first alternating current, and a second wire connected so as to receive a second alternating current substantially antiparallel to the first alternating current in the first wire, wherein the second wire is located adjacent the first wire such that a localized electromagnetic filed is created in a region local to the wire pair via constructive electromagnetic interference between the first wire and the second wire in the region local to the wire pair and destructive electromagnetic field interference between the first wire and the second wire outside of the region local to the wire pair; and a colour centre located within the crystal in the region local to the wire pair.

In embodiments, the apparatus comprises: a current source coupled to the first wire and the second wire and controllable to simultaneously generate a first alternating current in the first wire, and a second alternating in the second wire substantially antiparallel to the first alternating current.

In embodiments, the current source is configured to generate the second alternating current with substantially equal magnitude to the first alternating current.

In embodiments, the wire pair is a first wire pair, and the apparatus comprises: a second wire pair located outside of the region adjacent the first wire pair and formed of: a third wire adapted to receive a third alternating current, and a fourth wire adapted to receive a fourth alternating current substantially antiparallel to the third alternating current in the first wire, and located adjacent the third wire such that a second localized electromagnetic filed is created in a second region adjacent the second wire pair via constructive electromagnetic interference between the third wire and the fourth wire in said second region and destructive electromagnetic field interference between the third wire and the fourth wire outside of said second region; and a second colour centre located within the crystal in the second region adjacent the second wire pair.

In embodiments, the second wire of the first wire pair neighbours the third wire of the second wire pair, and the apparatus comprises: a current source coupled to the first wire, the second wire, the third wire and the fourth wire, and controllable to simultaneously generate: a first alternating current in the first wire of the wire pair, and a second alternating in the second wire of the wire pair, the second alternating current flowing substantially antiparallel to the first alternating current, a third alternating current in the third wire of the second wire pair neighbouring the second wire of the first wire pair, the third alternating current being substantially antiparallel to the second alternating current, and a fourth alternating current in the fourth wire of the second wire pair the fourth alternating current being substantially antiparallel to the third alternating current.

In embodiments, the second wire of the first wire pair neighbours the third wire of the second wire pair, and the apparatus comprises: a current source coupled to the first wire, the second wire, the third wire and the fourth wire, and controllable to simultaneously generate: a first alternating current in the first wire of the wire pair, and a second alternating current in the second wire of the wire pair, the second alternating current flowing substantially antiparallel to the first alternating current, a third alternating current in the third wire of the second wire pair neighbouring the second wire of the first wire pair, the third alternating current being substantially parallel to the second alternating current, and a fourth alternating current in the fourth wire of the second wire pair the fourth alternating current being substantially antiparallel to the third alternating current.

In embodiments, the apparatus comprises at least three further wire pairs lying substantially parallel to each other, each wire pair having being adapted to receive respective currents flowing substantially antiparallel to each other such that a localized electromagnetic filed is created in a region local to the wire pair, wherein the first and second wire pairs lie substantially parallel to each other, each of the first and second wire pairs lying non-parallel to each of the three further wire pairs, forming at least six crossing points between wire pairs; and at least six colour centres, each colour centre located within the crystal adjacent a different one of the at least six cross points.

In embodiments, the apparatus comprises a current source coupled to each wire of the first and second wire pairs and each of the at least three further wire pairs, and controllable to generate simultaneous currents in the wires of a first activation wire pair of the first and second wire pairs, and the wires of a second activation wire pair of the at least three further wire pairs, such that the simultaneous currents activate the colour centre adjacent the cross point between the first activation wire pair and the second activation wire pair.

In embodiments, the apparatus comprises a further colour centre located within the crystal in the region local to the wire pair, the colour centre and the further colour centre adapted to receive a magnetic field, such that a first projection of the magnetic onto a colour centre axis of the colour centre is different than a second projection of the magnetic field onto a colour centre axis of the further colour centre.

In embodiments, the apparatus further comprises a magnetic field generator configured to generate the magnetic field, wherein the simultaneous alternating currents have a first frequency substantially matching a first electron spin resonance frequency of the colour centre such that the colour centre is activated, wherein the first frequency differs from a second electron spin resonance frequency of the further colour centre such that the further colour centre is not activated.

In embodiments, the at least six colour centres are each configured to provide a qubit.

In embodiments, the at least six colour centres are each configured to operate as a quantum sensor.

According to another aspect disclosed herein there is provided a quantum system comprising: a crystal; a wire pair formed of a first wire adapted to receive a first alternating current, and a second wire adapted to receive a second alternating current substantially antiparallel to the first alternating current in the first wire, and located adjacent the first wire such that a localized electromagnetic field is created in a region local to the wire pair via constructive electromagnetic interference between the first wire and the second wire in the region local to the wire pair and destructive electromagnetic field interference between the first wire and the second wire outside of the region local to the wire pair; and a colour centre located within the crystal in the region local to the wire pair; a current source coupled to the first wire and the second wire; a memory embodying computer-readable instructions; and a processor coupled to the memory, wherein the processor is configured to execute the computer-readable instructions, which are configured, upon execution by the processor, to cause the processor to control the current source to simultaneously generate: a first alternating current in the first wire, and a second alternating in the second wire substantially antiparallel to the first alternating current.

According to another aspect disclosed herein, there is provided a method of addressing a colour centre in a crystal, the method comprising: generating a first alternating current in a first wire, and generating a second alternating in a second wire substantially antiparallel to the first alternating current, the second wire located adjacent the first wire such that a localized electromagnetic field is created in a region local to the wire pair via constructive electromagnetic interference between the first wire and the second wire in the region local to the wire pair and destructive electromagnetic field interference between the first wire and the second wire outside of the region local to the wire pair, the first and second wires arranged such that the colour centre is located within the crystal in the region local to the wire pair the localized electromagnetic field activates the colour centre.

A 'current source' may refer to an internal component (such as an electrical circuit, or groups of electrical circuits) of the apparatus that is coupled to the wire(s) and connectable to a power supply (such as a battery or set of batteries, a mains socket or power outlet etc.) and controllable, when connected to a power supply, to provide current to a given wire or wires.

It will be understood that the computer processor or processors 204 may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in non-transitory memory and executable by the processor, or by hardware, or by a combination of tangibly stored software and hardware (and tangibly stored firmware). Some aspects of the embodiments described herein with reference to the drawings comprise computer processes performed in processing systems or processors. Some aspects also extend to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc. Reference is made herein to data storage for storing data. This may be provided by a single device or by plural devices. Suitable devices include for example a hard disk and non-volatile semiconductor memory (e.g. a solid-state drive or SSD). Although at least some aspects of the embodiments described herein with reference to the drawings comprise computer processes performed in processing systems or processors, the invention also extends to computer programs, particularly computer programs on or in a carrier, adapted for putting the invention into practice. The program may be in the form of non-transitory source code, object code, a code intermediate source and object code such as in partially compiled form, or in any other non-transitory form suitable for use in the implementation of processes according to the invention. The carrier may be any entity or device capable of carrying the program. For example, the carrier may comprise a storage medium, such as a solid-state drive (SSD) or other semiconductor-based RAM; a ROM, for example a CD ROM or a semiconductor ROM; a magnetic recording medium, for example a floppy disk or hard disk; optical memory devices in general; etc. The examples described herein are to be understood as illustrative examples of embodiments of the invention. Further embodiments and examples are envisaged. Any feature described in relation to any one example or embodiment may be used alone or in combination with other features. In addition, any feature described in relation to any one example or embodiment may also be used in combination with one or more features of any other of the examples or embodiments, or any combination of any other of the examples or embodiments. Furthermore, equivalents and modifications not described herein may also be employed within the scope of the invention, which is defined in the claims.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. An apparatus comprising:
a crystal;
a wire pair formed of:
a first wire connected so as to receive a first alternating current, and
a second wire connected so as to receive a second alternating current substantially antiparallel to the first alternating current in the first wire, wherein the second wire is located adjacent the first wire such that a localized electromagnetic field is created in a region local to the wire pair via constructive electromagnetic interference between the first wire and the second wire in the region local to the wire pair and destructive electromagnetic field interference between the first wire and the second wire outside of the region local to the wire pair; and
a colour centre located within the crystal in the region local to the wire pair.

2. The apparatus of claim 1, comprising:
a current source coupled to the first wire and the second wire and controllable to simultaneously generate:
a first alternating current in the first wire, and
a second alternating in the second wire substantially antiparallel to the first alternating current.

3. The apparatus of claim 2, wherein the current source is configured to generate the second alternating current with substantially equal magnitude to the first alternating current.

4. The apparatus of claim 1, wherein the wire pair is a first wire pair, and the apparatus comprises:
a second wire pair located outside of the region adjacent the first wire pair and formed of:
a third wire connected so as to receive a third alternating current, and
a fourth wire connected so as to receive a fourth alternating current substantially antiparallel to the third alternating current in the first wire, and located adjacent the third wire such that a second localized electromagnetic filed is created in a second region adjacent the second wire pair via constructive electromagnetic interference between the third wire and the fourth wire in said second region and destructive electromagnetic field interference between the third wire and the fourth wire outside of said second region; and a second colour centre located within the crystal in the second region adjacent the second wire pair.

5. The apparatus of claim 4, wherein the second wire of the first wire pair neighbours the third wire of the second wire pair, and the apparatus comprises:
a current source coupled to the first wire, the second wire, the third wire and the fourth wire, and controllable to simultaneously generate:
a first alternating current in the first wire of the wire pair, and a second alternating in the second wire of the wire pair, the second alternating current flowing substantially antiparallel to the first alternating current, a third alternating current in the third wire of the second wire pair neighbouring the second wire of the first wire pair, the third alternating current being substantially antiparallel to the second alternating current, and a fourth alternating current in the fourth wire of the second wire pair the fourth alternating current being substantially antiparallel to the third alternating current.

6. The apparatus of claim 4, wherein the second wire of the first wire pair neighbours the third wire of the second wire pair, and the apparatus comprises:

a current source coupled to the first wire, the second wire, the third wire and the fourth wire, and controllable to simultaneously generate:

a first alternating current in the first wire of the wire pair, and a second alternating current in the second wire of the wire pair, the second alternating current flowing substantially antiparallel to the first alternating current, a third alternating current in the third wire of the second wire pair neighbouring the second wire of the first wire pair, the third alternating current being substantially parallel to the second alternating current, and a fourth alternating current in the fourth wire of the second wire pair the fourth alternating current being substantially antiparallel to the third alternating current.

7. The apparatus of claim 4, comprising at least three further wire pairs lying substantially parallel to each other, each wire pair having being connected so as to receive respective currents flowing substantially antiparallel to each other such that a localized electromagnetic filed is created in a region local to the wire pair, wherein the first and second wire pairs lie substantially parallel to each other, each of the first and second wire pairs lying non-parallel to each of the three further wire pairs, forming at least six crossing points between wire pairs; and at least six colour centres, each colour centre located within the crystal adjacent a different one of the at least six cross points.

8. The apparatus of claim 7 comprising a current source coupled to each wire of the first and second wire pairs and each of the at least three further wire pairs, and controllable to generate simultaneous currents in the wires of a first activation wire pair of the first and second wire pairs, and the wires of a second activation wire pair of the at least three further wire pairs, such that the simultaneous currents activate the colour centre adjacent the cross point between the first activation wire pair and the second activation wire pair.

9. The apparatus of claim 1, comprising a further colour centre located within the crystal in the region local to the wire pair, the colour centre and the further colour centre adapted to receive a magnetic field, such that a first projection of the magnetic onto a colour centre axis of the colour centre is different than a second projection of the magnetic field onto a colour centre axis of the further colour centre.

10. The apparatus of claim 2, comprising a further colour centre located within the crystal in the region local to the wire pair, the colour centre and the further colour centre connected so as to receive a magnetic field, such that a first projection of the magnetic onto a colour centre axis of the colour centre is different than a second projection of the magnetic field onto a colour centre axis of the further colour centre; and further comprising a magnetic field generator configured to generate the magnetic field, wherein the simultaneous alternating currents have a first frequency substantially matching a first electron spin resonance frequency of the colour centre such that the colour centre is activated, wherein the first frequency differs from a second electron spin resonance frequency of the further colour centre such that the further colour centre is not activated.

11. The apparatus of claim 1, wherein the at least six colour centres are each configured to provide a qubit.

12. The apparatus of claim 1, wherein the at least six colour centres are each configured to operate as a quantum sensor.

13. A quantum system comprising:
a crystal;
a wire pair formed of:
a first wire connected so as to receive a first alternating current, and
a second wire connected so as to receive a second alternating current substantially antiparallel to the first alternating current in the first wire, and located adjacent the first wire such that a localized electromagnetic field is created in a region local to the wire pair via constructive electromagnetic interference between the first wire and the second wire in the region local to the wire pair and destructive electromagnetic field interference between the first wire and the second wire outside of the region local to the wire pair; and
a colour centre located within the crystal in the region local to the wire pair; a current source coupled to the first wire and the second wire;
a memory embodying computer-readable instructions; and
a processor coupled to the memory, wherein the processor is configured to execute the computer-readable instructions, which are configured, upon execution by the processor, to cause the processor to control the current source to simultaneously generate:
a first alternating current in the first wire, and
a second alternating in the second wire substantially antiparallel to the first alternating current.

14. A method of addressing a colour centre in a crystal, the method comprising:
generating a first alternating current in a first wire, and
generating a second alternating in a second wire substantially antiparallel to the first alternating current, the second wire located adjacent the first wire such that a localized electromagnetic field is created in a region local to the wire pair via constructive electromagnetic interference between the first wire and the second wire in the region local to the wire pair and destructive electromagnetic field interference between the first wire and the second wire outside of the region local to the wire pair, the first and second wires arranged such that the colour centre is located within the crystal in the region local to the wire pair the localized electromagnetic field activates the colour centre.

* * * * *